United States Patent
Aisaka et al.

(10) Patent No.: US 8,478,072 B2
(45) Date of Patent: Jul. 2, 2013

(54) DEVICE, METHOD, AND PROGRAM FOR IMAGE PROCESSING

(75) Inventors: Kazuki Aisaka, Kanagawa (JP);
Masatoshi Yokokawa, Kanagawa (JP);
Nodoka Tokunaga, Tokyo (JP); Jun Murayama, Tokyo (JP)

(73) Assignee: Sony Corporation, Tokyo (JP)

( * ) Notice: Subject to any disclaimer, the term of this patent is extended or adjusted under 35 U.S.C. 154(b) by 255 days.

(21) Appl. No.: 13/012,779

(22) Filed: Jan. 24, 2011

(65) Prior Publication Data
US 2011/0206282 A1    Aug. 25, 2011

(30) Foreign Application Priority Data
Feb. 25, 2010 (JP) ................ P2010-040698

(51) Int. Cl.
*G06K 9/36* (2006.01)
(52) U.S. Cl.
USPC ........... 382/284; 382/209; 382/278; 382/294; 358/540; 358/450
(58) Field of Classification Search
USPC .. 382/209, 219, 278, 282, 284, 294; 358/538, 358/540, 450
See application file for complete search history.

(56) References Cited

U.S. PATENT DOCUMENTS

| | | | |
|---|---|---|---|
| 6,697,564 B1 * | 2/2004 | Toklu et al. | 386/285 |
| 6,750,974 B2 * | 6/2004 | Svetkoff et al. | 356/602 |
| 7,653,429 B2 * | 1/2010 | Madar et al. | 600/476 |
| 7,680,314 B2 * | 3/2010 | Hong | 382/131 |
| 7,692,688 B2 * | 4/2010 | Kurata | 348/208.5 |
| 7,836,050 B2 * | 11/2010 | Jing et al. | 707/728 |
| 8,068,693 B2 * | 11/2011 | Sorek et al. | 382/284 |

FOREIGN PATENT DOCUMENTS

| | | |
|---|---|---|
| JP | 2000-259822 | 9/2000 |
| JP | 2006-81224 | 3/2006 |

* cited by examiner

*Primary Examiner* — Yosef Kassa
(74) *Attorney, Agent, or Firm* — Finnegan, Henderson, Farabow, Garrett & Dunner, LLP

(57) ABSTRACT

An image processing device includes a subject region detector that detects a subject region from an input image; a cutting unit that cuts an image of the subject region from the input image; a priority calculator that calculates a priority of each of predetermined regions on a boundary with respect to the subject region, for the input image; a retrieval unit that retrieves a region similar to an image of a predetermined region with a top priority from among the priorities, from the input image after the image of the subject region is cut; a recovery unit that recovers the subject region by copying an image of an adjacent region that is adjacent to the region similar to the predetermined region retrieved by the retrieval unit and includes a region corresponding to a region cut as the subject region, and by pasting the image obtained by copying onto the region that is adjacent to the predetermined region with the top priority and cut as the subject region; and a composition unit that combines the image of the subject region cut by the cutting unit with the image with the subject region recovered by the recovery unit.

7 Claims, 21 Drawing Sheets

| INDEX | SIZE |
|---|---|
| 0 | 8 |
| 1 | 7 |
| 2 | 5 |
| 3 | 0 |

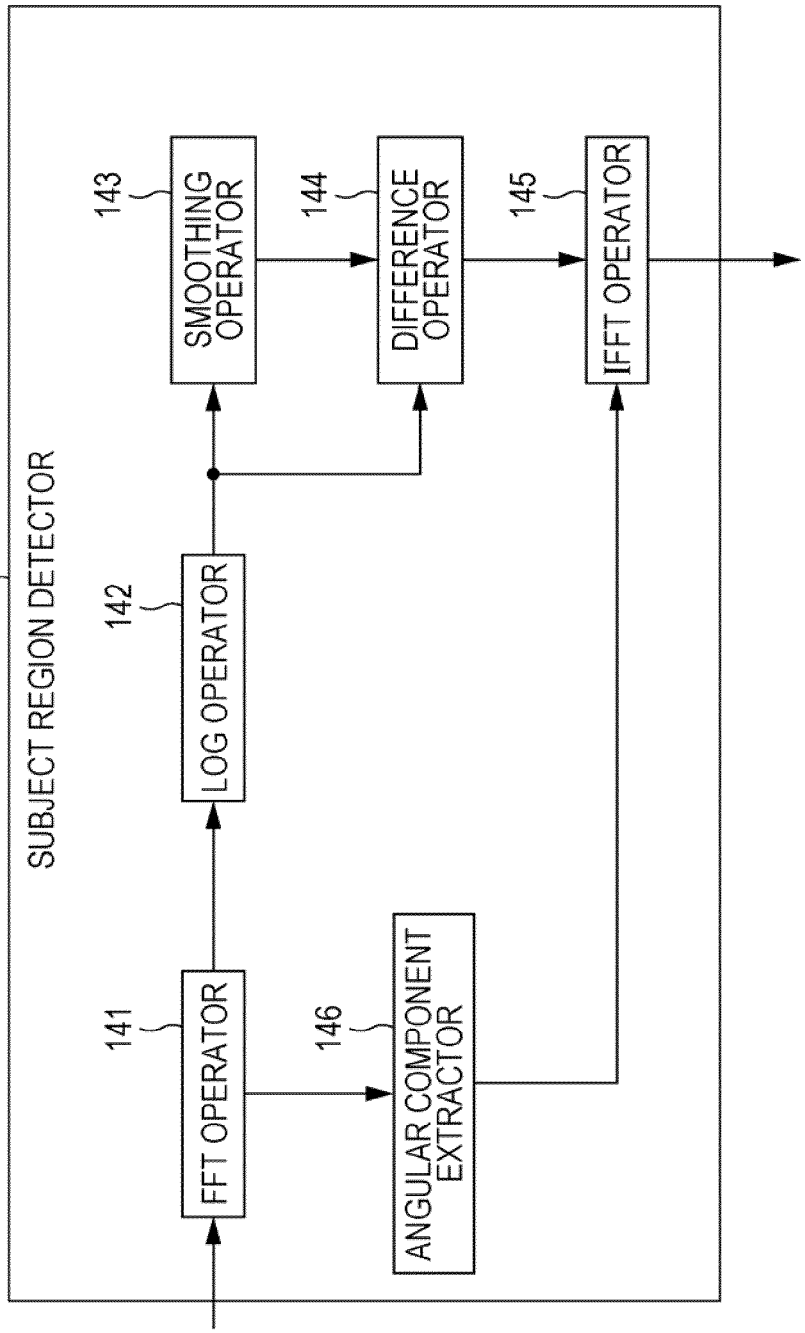

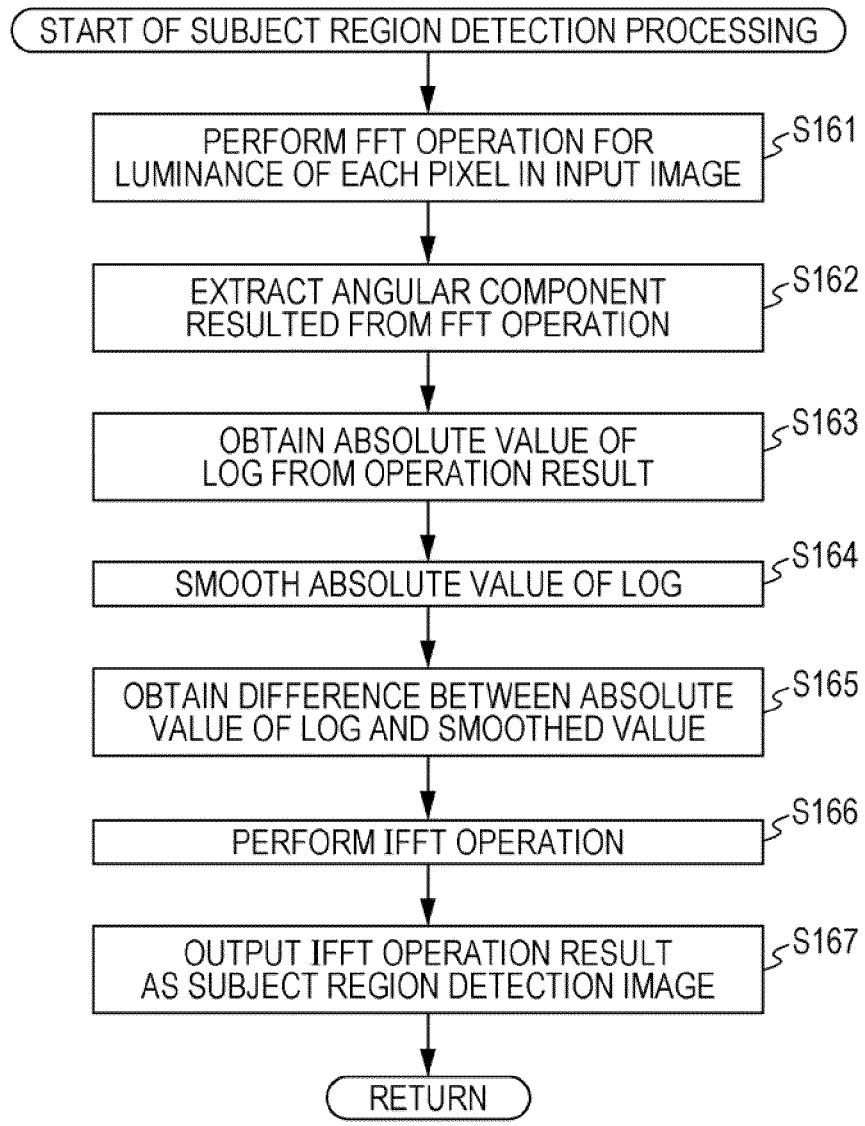

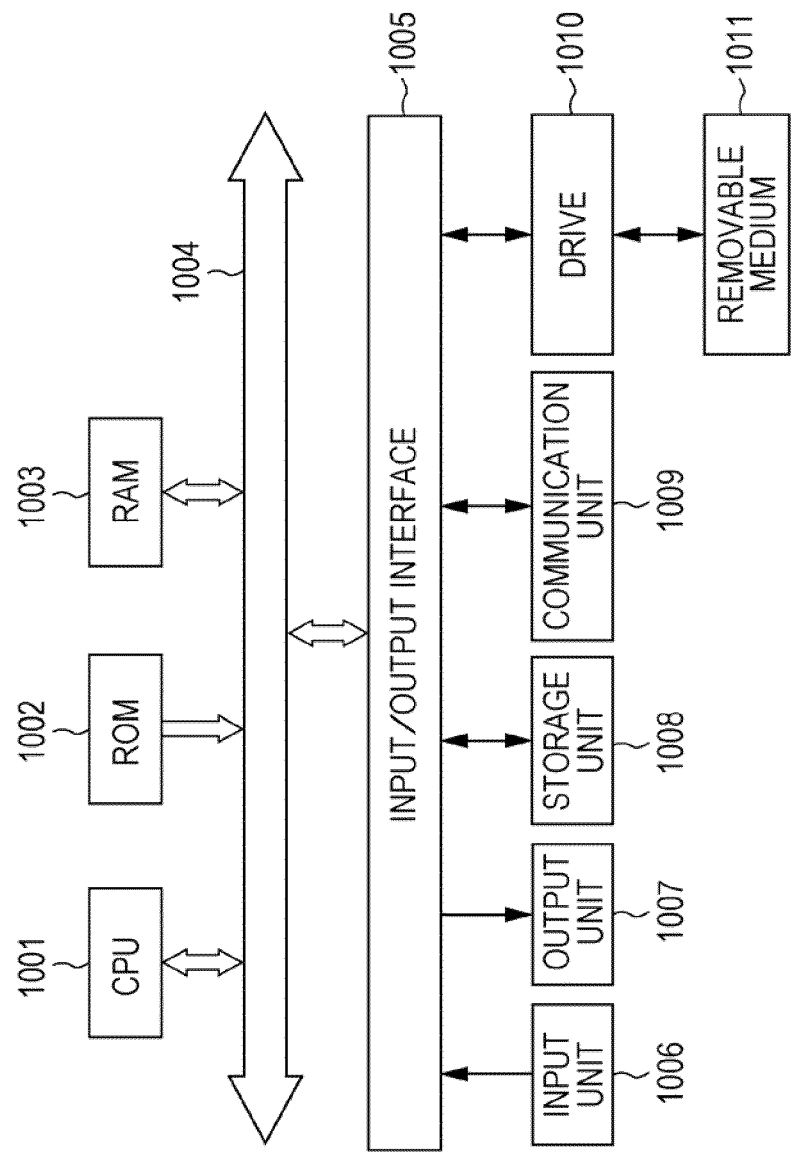

DEVICE, METHOD, AND PROGRAM FOR IMAGE PROCESSING

BACKGROUND OF THE INVENTION

1. Field of the Invention

The present invention relates to devices, methods, and programs for image processing, and more particularly to a device, a method, and a program for image processing that cut a subject and allow the subject to move to a free position when an image is edited.

2. Description of the Related Art

Software having an editing function that freely cuts a subject in an image and freely pastes the subject at a free position has been widely spread.

There has been suggested software included in the above software that can perform editing by superimposing a plurality of images and hence combining a plurality of subjects to provide a single image (see Japanese Unexamined Patent Application Publication No. 2000-259822).

Also, there has been suggested software that can process an image by adding various icons in the image (see Japanese Unexamined Patent Application Publication No. 2006-081224).

SUMMARY OF THE INVENTION

However, the technique disclosed in Japanese Unexamined Patent Application Publication No. 2000-259822 merely superimposes images, but does not cut a subject or correct the position of a subject in an original image.

Also, the technique described in Japanese Unexamined Patent Application Publication No. 2006-081224 merely provides the processing by adding an icon with a certain shape like a star shape. For example, the technique does not cut a subject.

In light of the situations, it is desirable to freely cut a subject and paste the subject at a free position particularly during image editing.

An image processing device according to an embodiment of the present invention includes subject region detection means for detecting a region, where a subject is present, as a subject region from an input image; cutting means for cutting an image of the subject region from the input image; priority calculation means for calculating a priority of each of predetermined regions on a boundary with respect to the subject region, for the input image; retrieval means for retrieving a region similar to an image of a predetermined region with a top priority from among the priorities of the predetermined regions on the boundary with respect to the subject region, from the input image after the image of the subject region is cut; recovery means for recovering the subject region by copying an image of an adjacent region that is adjacent to the region similar to the predetermined region retrieved by the retrieval means and includes a region corresponding to a region cut as the subject region, and by pasting the image obtained by copying the adjacent region onto the region that is adjacent to the predetermined region with the top priority and cut as the subject region; and composition means for combining the image of the subject region cut by the cutting means with the image with the subject region recovered by the recovery means.

The image processing device may further include additional region input means for inputting an additional region corresponding to the subject region; and subject region adding means for adding, as the subject region, the region with the additional region added to the subject region.

The priority calculation means may re-calculate a priority of each of the predetermined regions on the boundary with respect to the subject region recovered by the recovery means. The retrieval means may retrieve a region similar to an image of a predetermined region with a top priority from among the re-calculated priorities of the predetermined regions on the boundary with respect to the subject region, from the input image after the image of the subject region is cut. The recovery means may recover the subject region by copying an image of an adjacent region that is adjacent to the region similar to the predetermined region retrieved by the retrieval means and includes a region corresponding to a region cut as the subject region, and by pasting the image obtained by copying the adjacent region onto the region that is adjacent to the predetermined region with the top priority and cut as the subject region.

The priority calculation means, the retrieval means, and the recovery means may repeat their processing until an entire region of the subject region is recovered.

The composition means may be omitted if the accuracy of a cut image is sufficiently high.

An image processing method of an image processing device according to another embodiment of the present invention is provided. The image processing device includes subject region detection means for detecting a region, where a subject is present, as a subject region from an input image, cutting means for cutting an image of the subject region from the input image, priority calculation means for calculating a priority of each of predetermined regions on a boundary with respect to the subject region, for the input image, retrieval means for retrieving a region similar to an image of a predetermined region with a top priority from among the priorities of the predetermined regions on the boundary with respect to the subject region, from the input image after the image of the subject region is cut, recovery means for recovering the subject region by copying an image of an adjacent region that is adjacent to the region similar to the predetermined region retrieved by the retrieval means and includes a region corresponding to a region cut as the subject region, and by pasting the image obtained by copying the adjacent region onto the region that is adjacent to the predetermined region with the top priority and cut as the subject region, and composition means for combining the image of the subject region cut by the cutting means with the image with the subject region recovered by the recovery means. The image processing method includes the steps of detecting the region, where the subject is present, as the subject region from the input image, by the subject region detection means; cutting the image of the subject region from the input image, by the cutting means; calculating the priority of each of the predetermined regions on the boundary with respect to the subject region, for the input image, by the priority calculation means; retrieving the region similar to the image of the predetermined region with the top priority from among the priorities of the predetermined regions on the boundary with respect to the subject region, from the input image after the image of the subject region is cut, by the retrieval means; recovering the subject region by copying the image of the adjacent region that is adjacent to the region similar to the predetermined region retrieved by the retrieving and includes the region corresponding to the region cut as the subject region, and by pasting the image obtained by copying the adjacent region onto the region that is adjacent to the predetermined region with the top priority and cut as the subject region, by the recovery means; and combining the image of the subject region cut by the cutting with the image with the subject region recovered by the recovering, by the composition means.

An image processing program executable by a computer that controls an image processing device according to still another embodiment of the present invention is provided. The image processing device includes subject region detection means for detecting a region, where a subject is present, as a subject region from an input image, cutting means for cutting an image of the subject region from the input image, priority calculation means for calculating a priority of each of predetermined regions on a boundary with respect to the subject region, for the input image, retrieval means for retrieving a region similar to an image of a predetermined region with a top priority from among the priorities of the predetermined regions on the boundary with respect to the subject region, from the input image after the image of the subject region is cut, recovery means for recovering the subject region by copying an image of an adjacent region that is adjacent to the region similar to the predetermined region retrieved by the retrieval means and includes a region corresponding to a region cut as the subject region, and by pasting the image obtained by copying the adjacent region onto the region that is adjacent to the predetermined region with the top priority and cut as the subject region, and composition means for combining the image of the subject region cut by the cutting means with the image with the subject region recovered by the recovery means. The image processing program causing the computer to execute processing includes the steps of detecting the region, where the subject is present, as the subject region from the input image, by the subject region detection means; cutting the image of the subject region from the input image, by the cutting means; calculating the priority of each of the predetermined regions on the boundary with respect to the subject region, for the input image, by the priority calculation means; retrieving the region similar to the image of the predetermined region with the top priority from among the priorities of the predetermined regions on the boundary with respect to the subject region, from the input image after the image of the subject region is cut, by the retrieval means; recovering the subject region by copying the image of the adjacent region that is adjacent to the region similar to the predetermined region retrieved by the retrieving and includes the region corresponding to the region cut as the subject region, and by pasting the image obtained by copying the adjacent region onto the region that is adjacent to the predetermined region with the top priority and cut as the subject region, by the recovering; and combining the image of the subject region cut by the cutting with the image with the subject region recovered by the recovering, by the composition means.

According to yet another embodiment of the present invention, a region, where a subject is present, is detected as a subject region from an input image; an image of the subject region is cut from the input image; a priority of each of predetermined regions on a boundary with respect to the subject region is calculated for the input image; a region similar to an image of a predetermined region with a top priority from among the priorities of the predetermined regions on the boundary with respect to the subject region is retrieved from the input image after the image of the subject region is cut; the subject region is recovered by copying an image of an adjacent region that is adjacent to the region similar to the predetermined region retrieved by the retrieval means and includes a region corresponding to a region cut as the subject region, and by pasting the image obtained by copying the adjacent region onto the region that is adjacent to the predetermined region with the top priority and cut as the subject region; and the image of the subject region cut by the cutting means is combined with the image with the subject region recovered by the recovery means.

The image processing device according to any of the embodiments of the present invention may be an individually provided device or a block that performs image processing.

With any of the embodiments of the present invention, a subject can be cut and moved to a free position during image editing.

BRIEF DESCRIPTION OF THE DRAWINGS

FIG. 21 is a block diagram showing another configuration example of a subject region detector;

FIG. 22 is a flowchart explaining subject region detection processing by the subject region detector in FIG. 21; and FIG. 23 is an illustration explaining a configuration example of a general-purpose personal computer.

DESCRIPTION OF THE PREFERRED EMBODIMENTS

First Embodiment
Configuration Example of Image Processing Device

Figure 1:
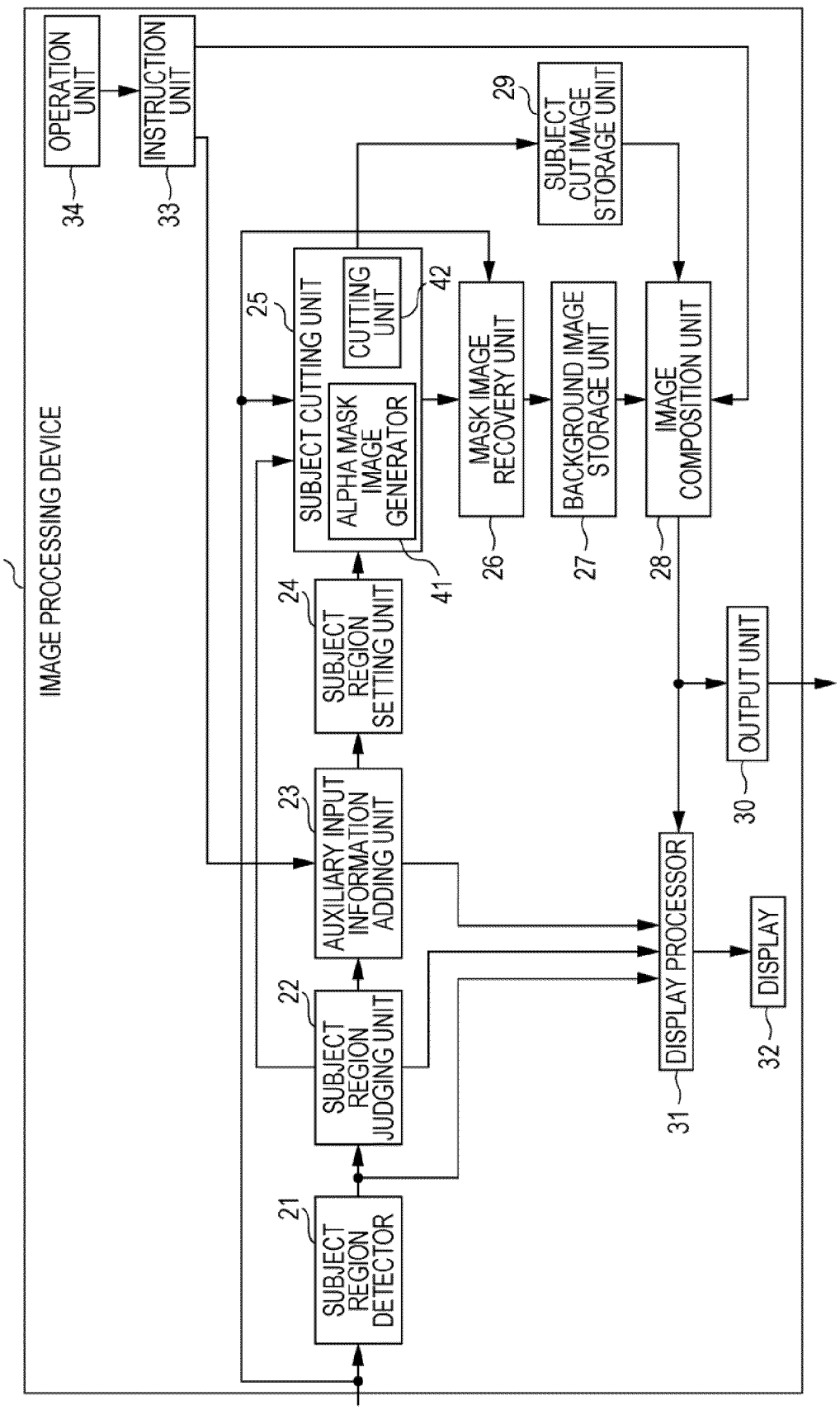
FIG. 1 is a block diagram showing a configuration example of an image processing device according to an embodiment of the present invention.

FIG. 1 illustrates a configuration example of hardware in an image processing device according to an embodiment of the present invention. An image processing device 11 in FIG. 1 performs editing by cutting a region of an object, which is a subject, from an input image, recovering a region after cutting, and then freely moving an image of the cut object region.

The image processing device 11 includes a subject region detector 21, a subject region judging unit 22, an auxiliary input information adding unit 23, a subject region setting unit 24, a subject cutting unit 25, a mask image recovery unit 26, a background image storage unit 27, an image composition unit 28, a subject cut image storage unit 29, and an output unit 30. The image processing device 11 also includes a display processor 31 and a display 32.

The subject region detector 21 detects a region of a subject included in an input image, and supplies information of the detected subject region and the input image to the subject region judging unit 22 and the display processor 31. For example, in a case of an image of a dog as shown in an image P1 in FIG. 1, the subject region detector 21 detects a region where the image of the dog, which is a subject, is present. In the image P1, a region Z1 that substantially includes an area where the dog is present is detected. However, in the image P1, the region Z1 indicated by a thick line may not include the entire range of the dog image, which is the subject, or a subject region may not be detected at all. The detailed configuration of the subject region detector 21 will be described later with reference to FIG. 3.

The subject region judging unit 22 judges whether the subject region is detected or not based on the detection result of the subject region detector 21. If the subject region is detected properly by a user of the image processing device 11 and auxiliary input is not necessary any more, the subject region judging unit 22 supplies information of the supplied subject detection region to the subject cutting unit 25. In contrast, if the subject region is not detected, or if the subject region is detected but it is judged that auxiliary input by the user is necessary, the subject region judging unit 22 supplies the subject region and the information of the input image to the auxiliary input information adding unit 23.

The auxiliary input information adding unit 23 receives an input of an auxiliary region to be added to the subject region and adds the auxiliary region to the subject region, based on an instruction signal that is supplied from an instruction unit 33 in response to an operation signal that is output from an operation unit 34, which is a mouse and/or a keyboard, in accordance with an operation content. Then, the auxiliary input information adding unit 23 supplies the subject region and the information of the auxiliary region to the subject region setting unit 24 and the display processor 31.

The subject region setting unit 24 edits and sets the subject region by adding the auxiliary region to the supplied subject region, and supplies the set subject region to the subject cutting unit 25. In particular, in the image P1 in FIG. 2, the range of the dog, which is the subject, is not completely detected as the subject region by the region Z1. Hence, with an operation by the user through the operation unit 34, the auxiliary region is added to the subject region, and a subject region is set as shown in an image P2 in FIG. 2. In the image P2 in FIG. 2, an area indicated by solid-line circles is the auxiliary region. Alternatively, the auxiliary input information adding unit 23 may be arranged downstream of the subject cutting unit. In particular, the auxiliary input may be added after the subject is cut, to correct the cut region.

Figure 4:
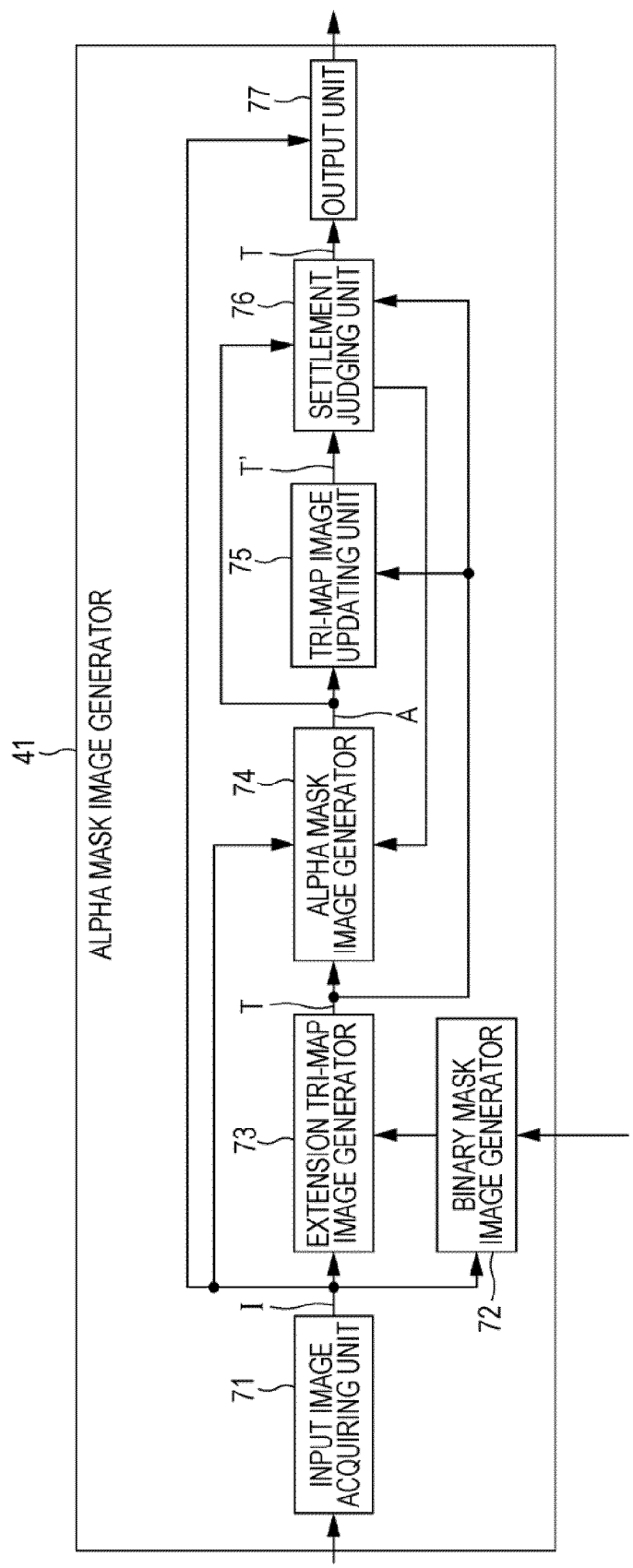
FIG. 4 is a block diagram showing a configuration example of an alpha mask image generator.
Figure 6:
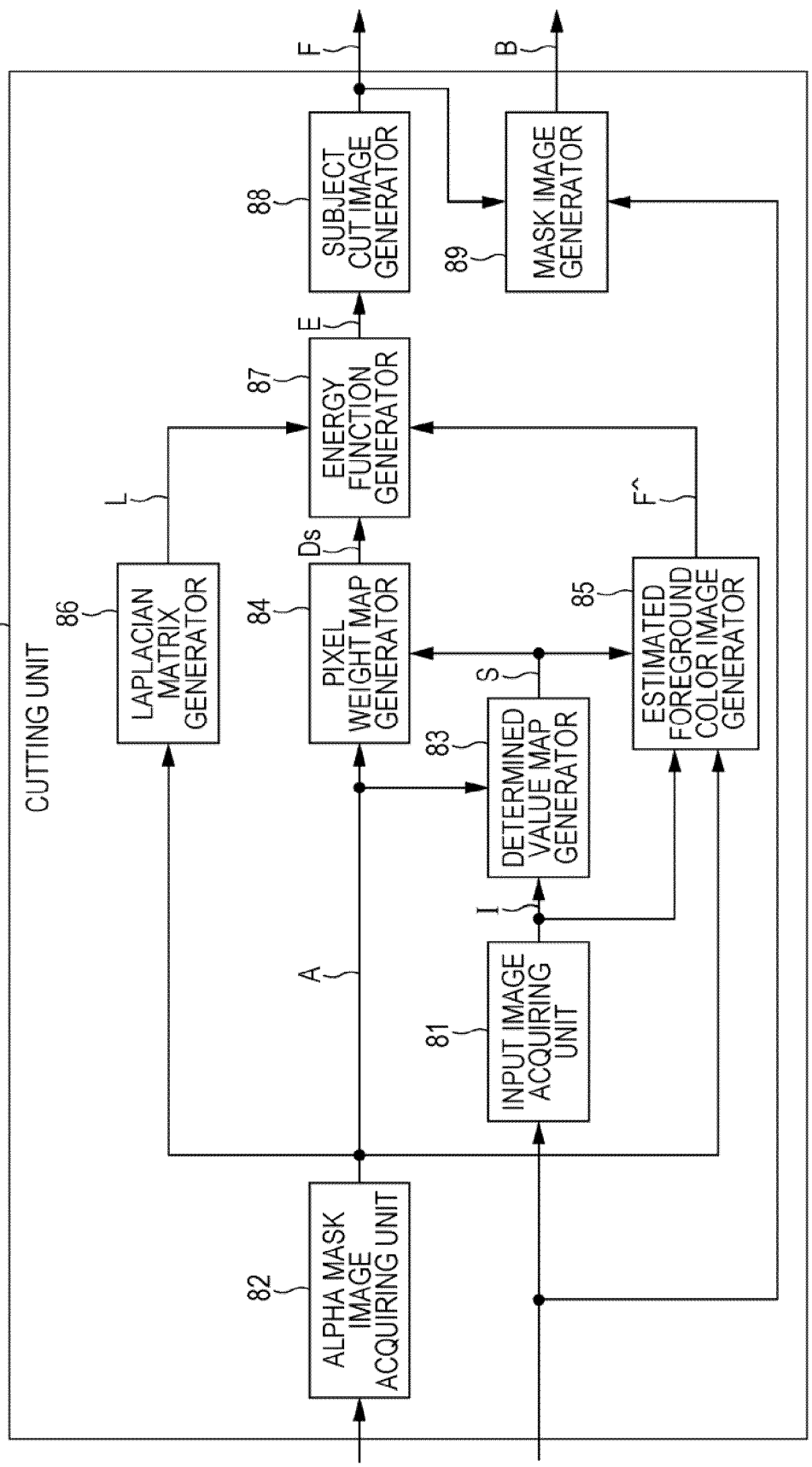
FIG. 6 is a block diagram showing a configuration example of a cutting unit.

The subject cutting unit 25 includes an alpha mask image generator 41 and a cutting unit 42. The subject cutting unit 25 cuts, as a subject cut image, the image of the subject region supplied by the subject region setting unit 24 or the subject region judging unit 22 from the input image, and stores the subject cut image in the subject cut image storage unit 29. Also, the subject cutting unit 25 supplies, as a mask image, the input image after the subject cut image is cut, to the mask image recovery unit 26. In particular, the subject cutting unit 25 obtains a complete boundary of the subject region from information of the subject cut region shown in the image P2, cuts a subject cut image D1 only including the dog as indicated by, for example, an image P3 in FIG. 2, and stores the subject cut image D1 in the subject cut image storage unit 29. Also, the subject cutting unit 25 supplies the mask image of the image P3 without the subject cut image D1, to the mask image recovery unit 26. The detailed configuration examples of the alpha mask image generator 41 and the cutting unit 42 of the subject cutting unit 25 will be described later with reference to FIGS. 4 and 6.

The mask image recovery unit 26 acquires, as the mask image, an input image including, as a mask, the region after the subject region is cut. The mask image recovery unit 26 recovers a mask region, which was the subject region, by using the information of the input image near the boundary with respect to the subject region. Thus, the mask image recovery unit 26 generates a background image without the subject and stores the background image in the background image storage unit 27. The detailed configuration example of the mask image recovery unit 26 will be described later with reference to FIG. 7.

The image composition unit 28 reads the background image, which is obtained by recovering the mask region by the background image storage unit 27; reads the subject cut image stored in the subject cut image storage unit 29; combines the read images to generate a composite image; and supplies the generated composite image to the output unit 30 and the display processor 31. At this time, the image composition unit 28 combines the images while changing the position of the subject cut image on the background image in various manners in accordance with an instruction content from the instruction unit 33. The detailed configuration example of the image composition unit 28 will be described later with reference to FIG. 8.

The output unit 30 outputs the composite image to a storage medium, such as a hard disk drive (HDD) or a semiconductor memory, or to an external device (not shown) including other display device.

The display processor 31 combines the subject region and the information of the auxiliary region supplied from the subject region detector 21 and the auxiliary input information adding unit 23 with the input image, and causes the display 32 to display the composite image. The display 32 may be a liquid crystal display (LCD) or an organic electro-luminescence (EL) display. Also, the display processor 31 causes the display 32 to display the composite image supplied from the image composition unit 28. Thus, the user can perform the series of operations while watching the display 32. When the display 32 displays the subject image at the position of the subject cut image D1 in an image P4 in FIG. 2, for example, if the subject image is moved to the position of a subject cut image D2 by an operation through the operation unit 34, editing is performed like the image P4 in FIG. 4. When a determining operation is made, the subject image of the dog, which is the subject, displayed as the subject cut image D1 in the image P3, is deleted as indicated by dotted lines in an image P5, and the image is edited into an image only with the subject cut image D2.

Configuration Example of Subject Region Detector

Figure 3:
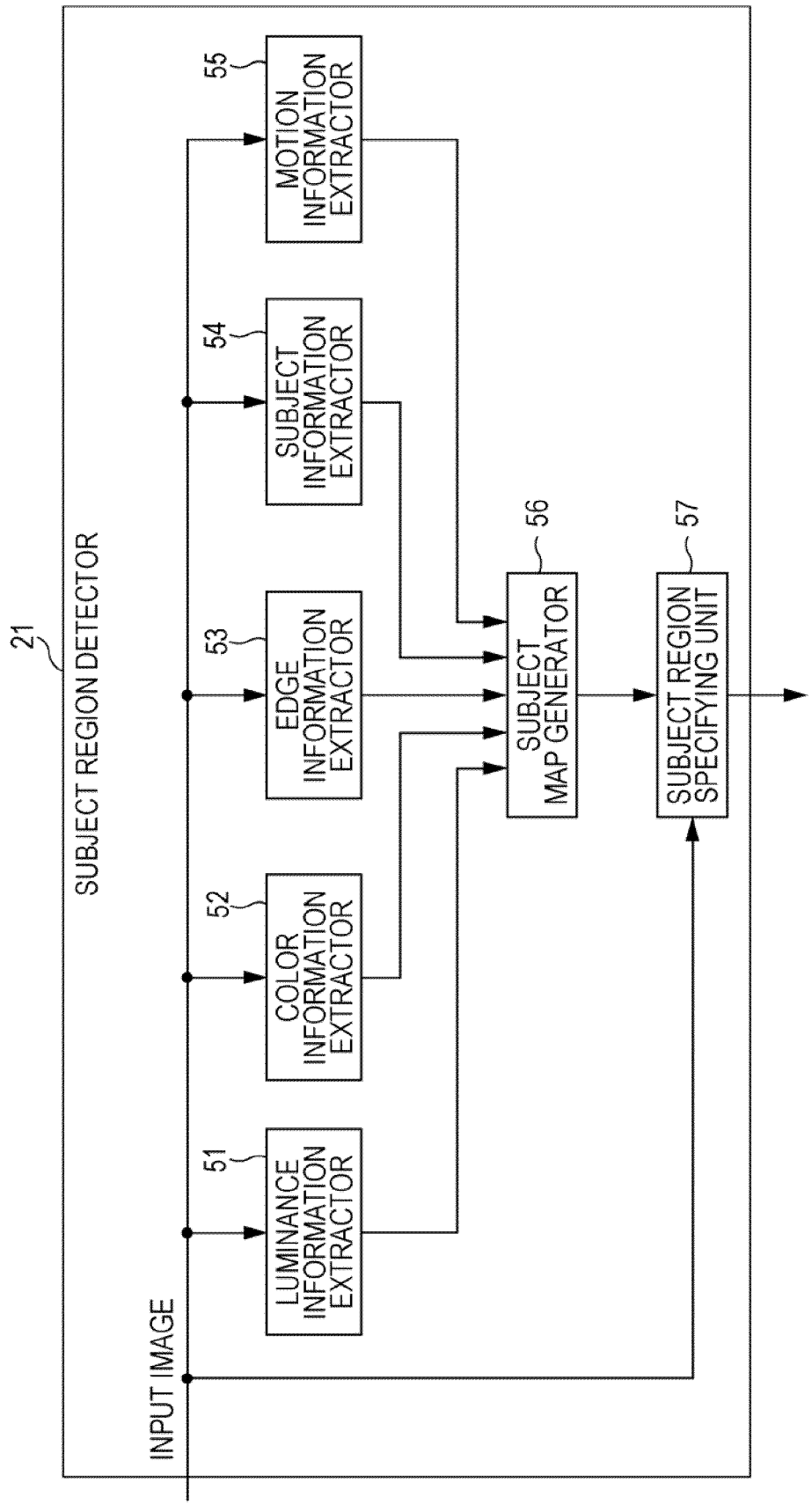
FIG. 3 is a block diagram showing a configuration example of a subject region detector.

Next, the configuration example of the subject region detector 21 will be described below with reference to FIG. 3.

The subject region detector 21 includes a luminance information extractor 51, a color information extractor 52, an edge information extractor 53, a subject information extractor 54, a motion information extractor 55, a subject map generator 56, and a subject region specifying unit 57.

The luminance information extractor 51 to the motion information extractor 55 each extract predetermined information from the supplied input image, and generate an information map indicative of a likelihood of a subject region in each region of the input image based on extraction information image including the extracted information. The information included in the information map is information indicative of the amount of a feature that is included by a larger amount in the region including the subject. The information is arranged in association with each region of the input image, resulting in the information map. That is, the information map is information indicative of the amount of a feature included in each region of the input image.

The subject is an object on an input image that is expected to be watched by the user when the user glances at the input image, i.e., an object that is expected to be focused by the user. Therefore, the subject does not have to be a person. Also, the luminance information extractor 51 to the motion information extractor 55 generate, as information maps, a luminance information map, a color information map, an edge information map, a subject information map, and a motion information map.

To be more specific, the luminance information extractor 51 generates the luminance information map by using, as the extraction information image, a luminance image including a Y (luminance) component of the supplied input image, and supplies the luminance information map to the subject map generator 56. The color information extractor 52 generates the color information map by using, as the extraction information image, a Cr image including a Cr component and a Cb image including a Cb component of the supplied input image, and supplies the color information map to the subject map generator 56.

The edge information extractor 53 generates the edge information map by using, as the extraction information image, an edge image including an edge intensity in each region of the supplied input image, and supplies the edge information map to the subject map generator 56. The subject information extractor 54 generates a face information map by using, as the extraction information image, an image including information for recognizing the subject, for example, if the subject is a person, information relating to the face of the person, in each region of the supplied input image, and supplies the face information map to the subject map generator 56. The motion information extractor 55 generates the motion information map by using, as the extraction information image, an image including information relating to a motion in each region of the supplied input image, and supplies the motion information map to the subject map generator 56.

The subject map generator 56 generates a subject map by adding the information maps supplied from the luminance information extractor 51 to the motion information extractor 55 together, and supplies the subject map to the subject region specifying unit 57. The subject map is information for specifying the region including the subject in the input image.

The subject region specifying unit 57 specifies the region of the subject on the supplied input image by using the subject map from the subject map generator 56, and outputs the specification result. Configuration Example of Alpha Mask Image Generator Next, the detailed configuration example of the alpha mask image generator 41 of the subject cutting unit 25 will be described with reference to FIG. 4.

The alpha mask image generator 41 generates a tri-map image for generating an alpha mask image (a ratio image indicative of the ratio of a transparency of a foreground object image), which is necessary for extraction of the subject image, by simply selecting the subject image, which is a foreground object image to be extracted, and a background image from the input image. The alpha mask image generator 41 generates the alpha mask image from the tri-map image. In the following description, a subject image is occasionally referred to as a foreground image or a foreground object image, and an image other than the subject image may be also referred to as a background image.

The alpha mask image generator 41 includes an input image acquiring unit 71, a binary mask image generator 72, an extension tri-map image generator 73, an alpha mask image generator 74, a tri-map image updating unit 75, a settlement judging unit 76, and an output unit 77.

The input image acquiring unit 71 acquires an input image as an input image I including a foreground object image, which is a subject image to be extracted. The input image acquiring unit 71 supplies the acquired input image I to the binary mask image generator 72, the extension tri-map image generator 73, and the alpha mask image generator 74.

The binary mask image generator 72 generates a binary mask image B from the input image I based on subject region setting information supplied from the subject region judging unit 22 or the subject region setting unit 24, and supplies the binary mask image B to the extension tri-map image generator 73.

Figure 2:
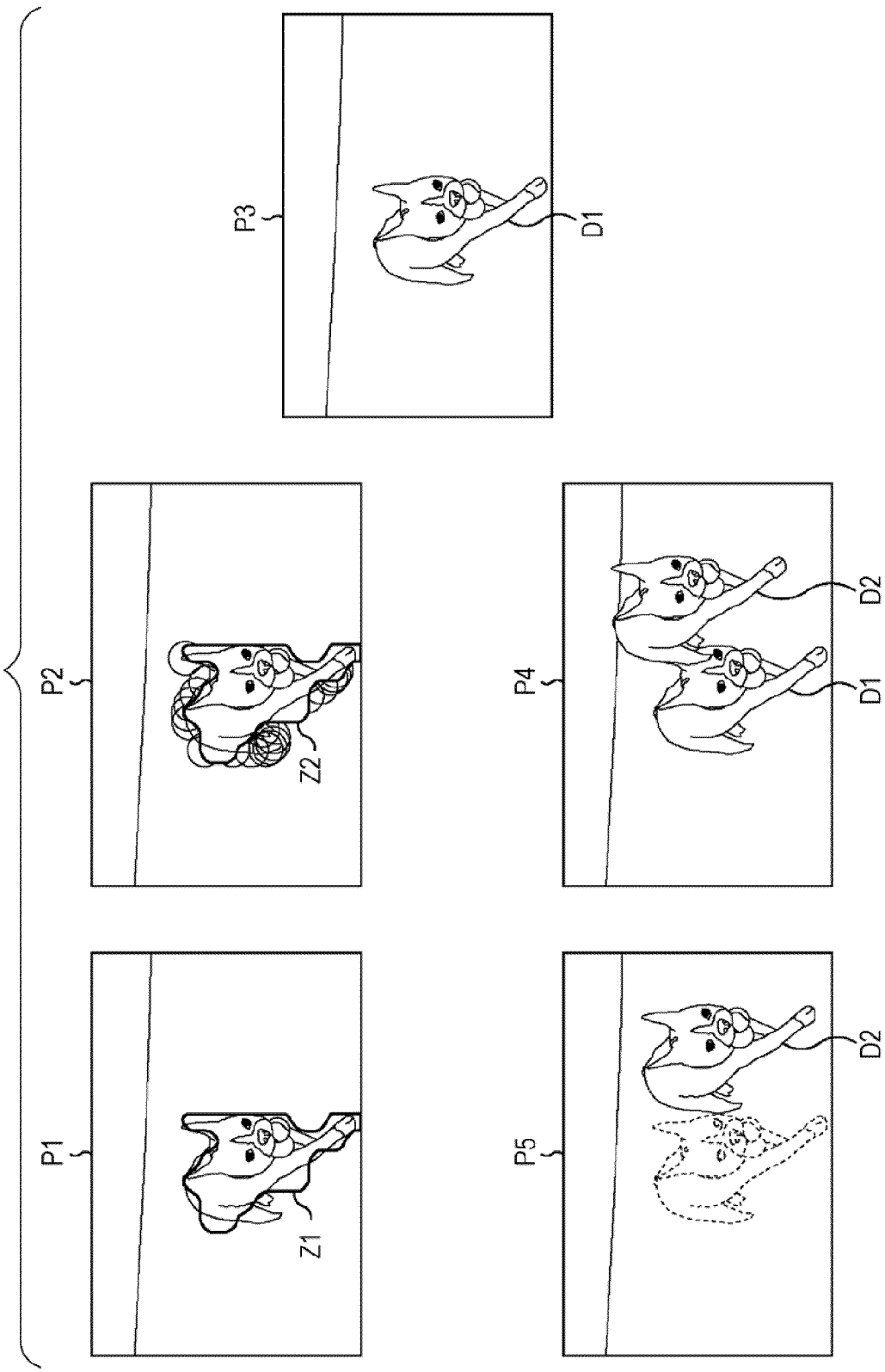
FIG. 2 is an illustration explaining image editing executed by the image processing device in FIG. 1.
Figure 5:
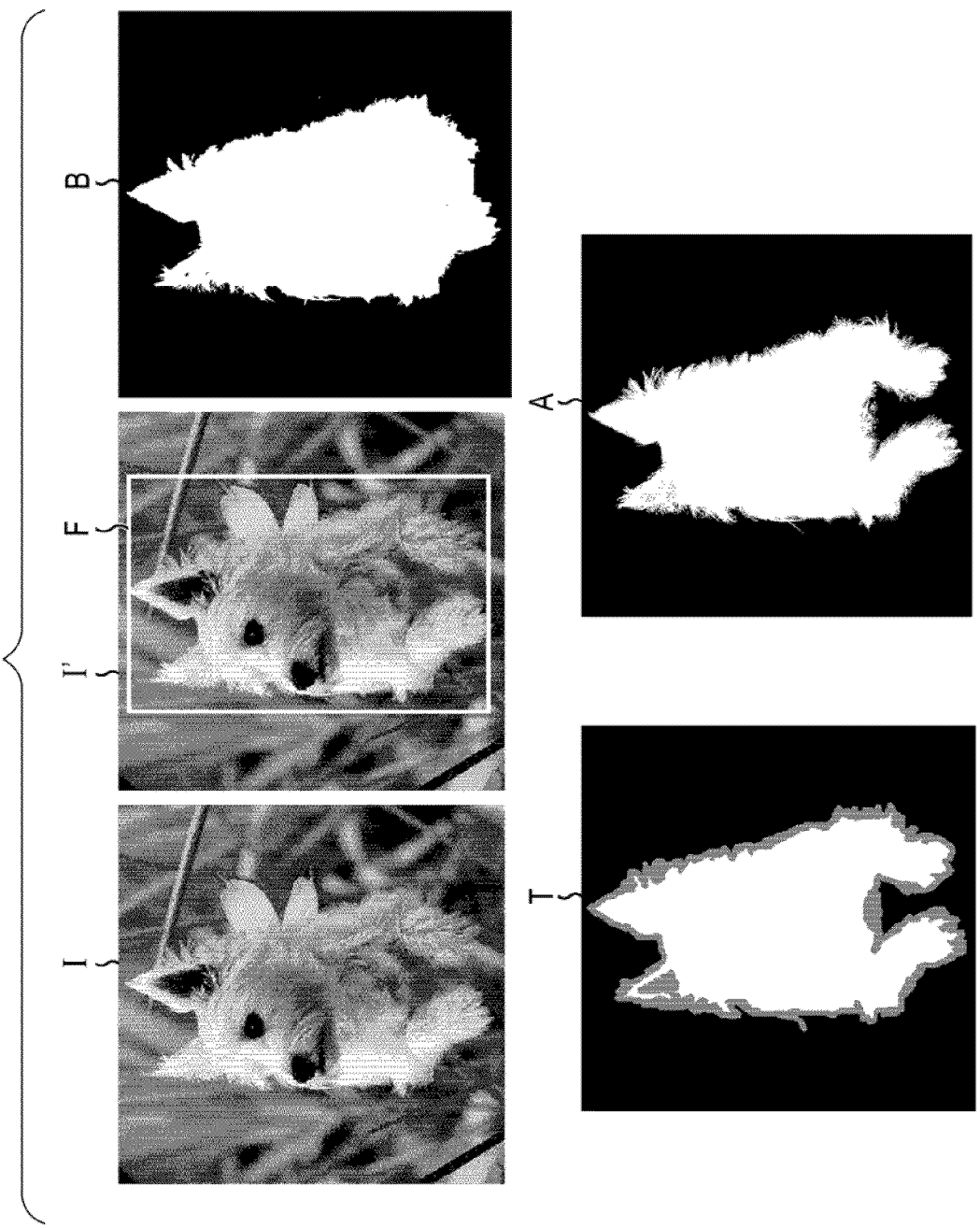
FIG. 5 is an illustration explaining an operation of the alpha mask image generator in FIG. 4.

To be more specific, the foreground object image to be extracted is selected by using, for example, a rectangular frame F (in FIG. 2, a region Z2 set by the subject region setting unit 24) as shown in an image I' in FIG. 5 corresponding to the image P2 in FIG. 2 from an input image I in FIG. 5.

In this case, in the input image I' in FIG. 5, an image of a puppy in the frame F is selected as the foreground object image, and an area outside the frame F is selected as the background image. When grab cut processing is performed for the input image I', the binary mask image generator 72 separates the foreground object image by using statistical information (variation of distribution) based on a sample color in the foreground object image and the background image.

That is, the binary mask image generator 72 separates the foreground object image such that the boundary between the foreground object image and the background image is located at an edge portion in the frame F in the input image I'. Consequently, if the label of a pixel is 1 or 0 in association with the foreground object image and the background image, the binary mask image generator 72 determines a pixel value of a region in the foreground object image with the label 1 as white and determines the other pixel value with the label 0 as black. With this processing, the binary mask image generator 72 generates a binary mask image B as shown in the upper right section of FIG. 5.

The extension tri-map image generator 73 sets an undetermined region with a predetermined width at the boundary between the foreground object image and the background image from the input image I and the binary mask image B. In particular, the extension tri-map image generator 73 sets, as undetermined pixels, pixels in a region that is located near the boundary between a region that defines the foreground object image and a region that defines the background image, that extends along the boundary, and that has a width by a predetermined number of pixels. Accordingly, a tri-map image T is generated, the tri-map image T including three types of pixels, i.e., a pixel (label=1) that belongs to the foreground object image, a pixel (label=0) that belongs to the background image, and an undetermined pixel (label=−1).

That is, the extension tri-map image generator 73 generates the tri-map image T including ternary pixels as shown in the lower left section of FIG. 5, and supplies the tri-map image T to the alpha mask image generator 74. In the tri-map image T in FIG. 5, the pixel value in the region of the foreground object image with label=1 is set to white (a maximum pixel value). Also, the pixel value in the region of the background image with label=0 is set to black (a minimum pixel value). Further, the pixel value in the undetermined region with label=−1 is set to gray (an intermediate pixel value). The extension tri-map image generator 73 supplies the generated tri-map image T to the alpha mask image generator 74 and the settlement judging unit 76.

The alpha mask image generator 74 acquires the tri-map image T from the extension tri-map image generator 73 in initial processing. Also, the alpha mask image generator 74 acquires the tri-map image T supplied from the settlement judging unit 76 in processing after the initial processing.

Also, the alpha mask image generator 74 performs robust matting processing (see Jue Wang, M F Cohen, Optimized Color Sampling for Robust Matting, Computer Vision and Pattern Recognition, 2007) for the tri-map image T, to generate an alpha mask image A as shown in the lower right section of FIG. 5, and supplies the alpha mask image A to the tri-map image updating unit 75 and the settlement judging unit 76. The alpha mask image A is an image in which the transparency α of the foreground object image is expressed as α=1, the transparency α of the background image is expressed as α=0, and the intermediate transparency α of these transparencies α is expressed as 0<α<1 on a pixel basis.

In particular, the puppy, which is the foreground object image (the subject image), shown in FIG. 5 is covered with long hairs, and the hair portion serves as the boundary with respect to the background region. In the pixels near the boundary between the foreground object image and the background image have mixed colors including the color of the hairs of the puppy in the foreground region and the color of the background region. With regard to this, the transparencies α of the pixels near the boundary frequently meet 0<α<1. Accordingly, the transparency α can be considered as a composition ratio of the color of the foreground object region from among a mixture ratio of the colors of the pixels in the boundary region in the input image.

The tri-map image updating unit 75 generates a tri-map image T' by determining the pixels with the transparencies a of 0<α<1 and the pixels near that pixels as the pixels in the undetermined region in the alpha mask image A. The tri-map image updating unit 75 supplies, as the update result of the tri-map image T, the newly generated tri-map image T' to the settlement judging unit 76.

The settlement judging unit 76 compares the tri-map image T before the update by the tri-map image updating unit 75 with the tri-map image T' updated by the tri-map image updating unit 75, and judges whether these tri-map images are identical with each other or not (or substantially identical with each other or not). To be more specific, the settlement judging unit 76 judges whether or not the distribution of the foreground object image (the subject image), the undetermined pixels, and the background image of the tri-map image T before the update coincides with that of the updated tri-map image T'. If these tri-map images do not coincide or substantially coincide with each other, the settlement judging unit 76 supplies, as the tri-map image T, the tri-map image T' to the alpha mask image generator 74 together with the judgment result. In contrast, if the settlement judging unit 76 judges that these tri-map images are identical with each other, the settlement judging unit 76 supplies, as the tri-map image T, the tri-map image T' to the output unit 77 together with the alpha mask image A, which can be obtained by performing robust matting for the tri-map image T'.

The output unit 77 outputs, as the processing result, the tri-map image T supplied from the settlement judging unit 76 and the alpha mask image A obtained by performing robust matting for the tri-map image T (T').

That is, each pixel of the input image I is multiplied by a value of the binary mask image B, and hence the image of the puppy can be extracted as the foreground object image. However, if the foreground object image is extracted by this method, the hair portion, which is an outer edge portion of the puppy of the foreground object image, may include color blur originally present in the background image. Owing to this, the extracted foreground object image may seem to be unnatural, for example, when the image is combined with the other image.

Hence, the image processing device 1 repeats the processing of generating the alpha mask image A from the tri-map image T by, for example, robust matting, and obtaining the tri-map image T' from the generated alpha mask image A. The image processing device 1 repeats the similar processing until the tri-map images T and T' become identical or substantially identical with each other and the change between the tri-map images T and T' is settled, so that the image processing device 1 obtains a proper tri-map image, and then an optimal alpha mask image corresponding to the tri-map image.

Configuration Example of Cutting Unit

The cutting unit 42 can extract the foreground object image (the subject image) F without color blur from the input image I based on the alpha mask image (the ratio image indicative of the ratio of the transparency of the foreground object image which is the subject image) A. The alpha mask image A is generated by the alpha mask image generator 41.

The cutting unit 42 includes an input image acquiring unit 81, an alpha mask image acquiring unit 82, a determined value map generator 83, a pixel weight map generator 84, an estimated foreground color image generator 85, a Laplacian matrix generator 86, an energy function generator 87, a foreground color image generator 88, and a mask image generator 89.

The input image acquiring unit 81 acquires the input image I including the foreground object image, which is the subject image to be extracted, and supplies the acquired input image I to the determined value map generator 83 and the estimated foreground color image generator 85.

The alpha mask image acquiring unit 82 acquires the alpha mask image (the ratio image indicative of the ratio of the transparency of the foreground object image) A including the value indicative of the transparency α (hereinafter, also referred to as α value) on a pixel basis of the foreground object image supplied from the alpha mask image generator 41. Then, the alpha mask image acquiring unit 82 supplies the acquired alpha mask image A to the determined value map generator 83, the pixel weight map generator 84, the estimated foreground color image generator 85, and the Laplacian matrix generator 86. The detailed configuration of the estimated foreground color image generator 85 will be described later with reference to FIG. 2.

The determined value map generator 83 generates a determined value map image S from the alpha mask image A and the input image I. The determined value map image S includes a pixel of a first pixel value determined as the foreground object image, which is the subject image, or the background image, and a pixel of a second pixel value not belonging to the first pixel value. Then, the determined value map generator 83 supplies the generated determined value map image S to the pixel weight map generator 84 and the estimated foreground color image generator 85. Here, the pixel not belonging to the foreground object image or the background image is a pixel that is expected to have a mixed color of a color in the foreground object image and a color in the background image. For example, the first pixel value is set to 1 and the second pixel value is set to 0 in the determined value map image S. Further, the determined value map generator 83 adds information to the determined pixel in the determined value map image S. The information is for identifying whether the determined pixel is a pixel belonging to the foreground object image or to the background image.

The pixel weight map generator 84 generates a pixel weight map image Ds from the determined value map image S and the alpha mask image A, and supplies the generated pixel weight map image Ds to the energy function generator 87. To be more specific, the pixel weight map generator 84 generates the pixel weight map image Ds by setting the pixel value of the alpha mask image A corresponding to a pixel in an undetermined region in the determined value map image S, i.e., the transparency $\alpha$ as a weight of the pixel.

The estimated foreground color image generator 85 generates an estimated foreground color image $F^\wedge$ from the input image I, the alpha mask image A, and the determined value map image S, and supplies the generated estimated foreground color image $F^\wedge$ to the energy function generator 87. To be more specific, the estimated foreground color image generator 85 obtains differential values by a Sobel filter for pixels of the alpha mask image A respectively corresponding to pixels in the undetermined region in the determined value map image S. Then, when it is assumed that a distance is an integral value of differential values of undetermined pixels present on a path from each undetermined pixel to a pixel at the boundary of a determined region, the estimated foreground color image generator 85 sets a determined pixel with a minimum distance, as a pixel value of each undetermined pixel. Accordingly, an image including pixel values at pixel positions of the foreground object image with minimum distances when the distance is the integral value of the differential values corresponding to the undetermined pixels can be obtained as the estimated foreground color image $F^\wedge$.

The Laplacian matrix generator 86 hypothesizes a linear model of pixel values of the foreground object image and the background image in a local region from the alpha mask image A based on, for example, average and variance of peripheral pixels around the position of a target pixel; calculates contributions of the peripheral pixels; and generates a Laplacian matrix L. The Laplacian matrix L is a positive definite symmetric sparse matrix with the number of rows and columns corresponding to the number of all pixels of the alpha mask image A.

Each component of the Laplacian matrix L has, for example, a weight with respect to an adjacent pixel. A linear model is hypothesized such that the color of the foreground object image and the color of the background image in a small region of 3×3 pixels are substantially constant whereas only $\alpha$ values are changed. Each component of the Laplacian matrix L is calculated through average and covariance of the small region of 3×3 pixels around the center pixel. This component can define by which degree the $\alpha$ value of the center pixel should be similar to the $\alpha$ value of the adjacent pixel. For the detail of the Laplacian matrix L, for example, see A. Levin, D. Lischinski, Y. Weiss, A Closed Form Solution to Natural Image Matting, 2006 Conference on Computer Vision and Pattern Recognition (CVPR 2006), June 2006, pp. 61-68.

The energy function generator 87 generates an energy function E by using, as a parameter, a vector x of a color image Fc of RGB of the foreground color image F based on the pixel weight map image Ds, the Laplacian matrix L, and the estimated foreground color image $F^\wedge$, and supplies the generated energy function E to the foreground color image generator 88.

The foreground color image generator 88 obtains a vector x of the color image Fc of RGB with a minimum energy function E, obtains the foreground color image F from vectors x of respective colors, and outputs the foreground color image F as the foreground object image, which is defined by the alpha mask image A, from the input image I. The foreground color image F is the foreground object image that is extracted from the input image I based on the alpha mask image A that is finally extracted.

The mask image generator 89 cuts the subject image, which is the foreground object image, from the input image; generates a mask image, and supplies the mask image to the mask image recovery unit 26.

Configuration Example of Mask Image Recovery Unit

Figure 7:
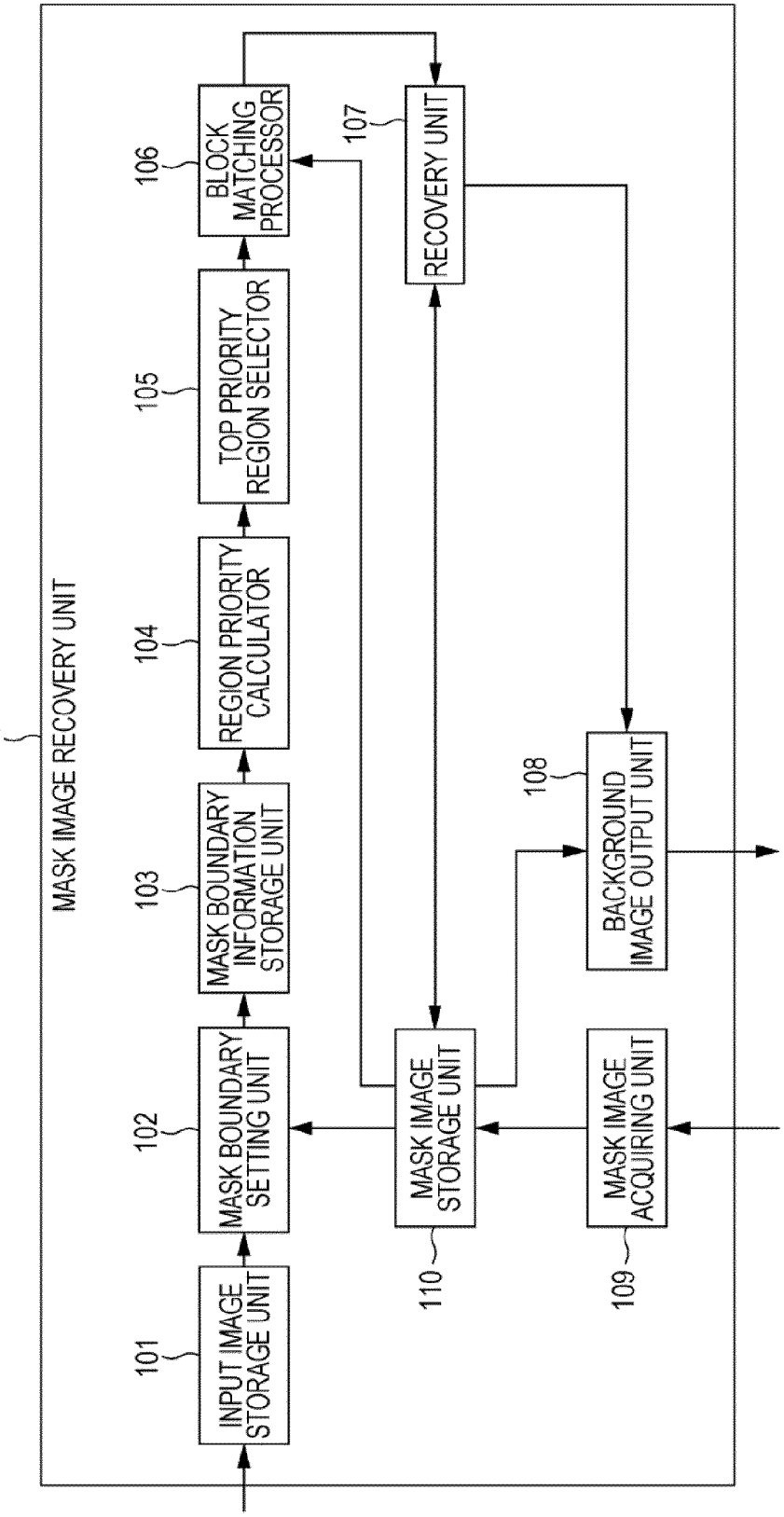
FIG. 7 is a block diagram showing a configuration example of a mask image recovery unit.

Next, the configuration example of the mask image recovery unit 26 will be described below with reference to FIG. 7.

The mask image recovery unit 26 includes an input image storage unit 101, a mask boundary setting unit 102, a mask boundary information storage unit 103, a region priority calculator 104, a top priority region selector 105, a block matching processor 106, a recovery unit 107, a background image output unit 108, a mask image acquiring unit 109, and a mask image storage unit 110.

The input image storage unit 101 stores the supplied input image, and supplies the input image to the mask boundary setting unit 102 and the block matching processor 106. The mask image acquiring unit 109 acquires the mask image supplied from the subject cutting unit 25, and stores the mask image in the mask image storage unit 110. The mask boundary setting unit 102 reads the mask image stored in the mask image storage unit 110, sets the region of the input image present at the boundary of the mask region, and supplies the mask image to the region priority calculator 104 together with information of the set mask boundary.

The region priority calculator 104 divides the boundary region with respect to the mask image in the input image into a plurality of predetermined regions; calculates priorities respectively for the divided predetermined regions; and supplies the priorities to the top priority region selector 105. The region priority calculator 104 may process a block with many edge regions first. For the detail of a method for calculating the priorities by the region priority calculator 104, see A. Criminisi, P. Perez, K. Toyama, Object Removal by Exemplar-Based Inpainting, CVPR 2003.

The top priority region selector 105 selects a predetermined region with a maximum value of a priority (a top priority) from among the priorities respectively calculated for the predetermined regions, and supplies information of the selected region to the block matching processor 106.

The block matching processor 106 verifies the mask image by using the image information of the predetermined region with the top priority, and retrieves a region with an image similar to an image of the predetermined region with the top priority by block matching. Then, the block matching processor 106 supplies information of an adjacent region that is adjacent to a region the most similar to the predetermined region with the top priority and that is adjacent to a position corresponding to a mask region adjacent to the predetermined region, to the recovery unit 107.

The recovery unit 107 reads the mask image from the mask image storage unit 110, and paste the information of the adjacent region supplied from the block matching processor 106 on the region that is the predetermined region with the top priority and that is adjacent to the position corresponding to the mask region, to recover the mask region. Also, the recovery unit 107 updates information of the recovered mask region, and stores the recovered information in the mask image storage unit 110. When the series of processing is repeated and the mask region is entirely recovered, the recovery unit 107 notifies the background image output unit 108 about the completion of the recovery, and stores the recovered mask image stored in the mask image storage unit 110, in the background image storage unit 27, as the background image.

Configuration Example of Image Composition Unit

Figure 8:
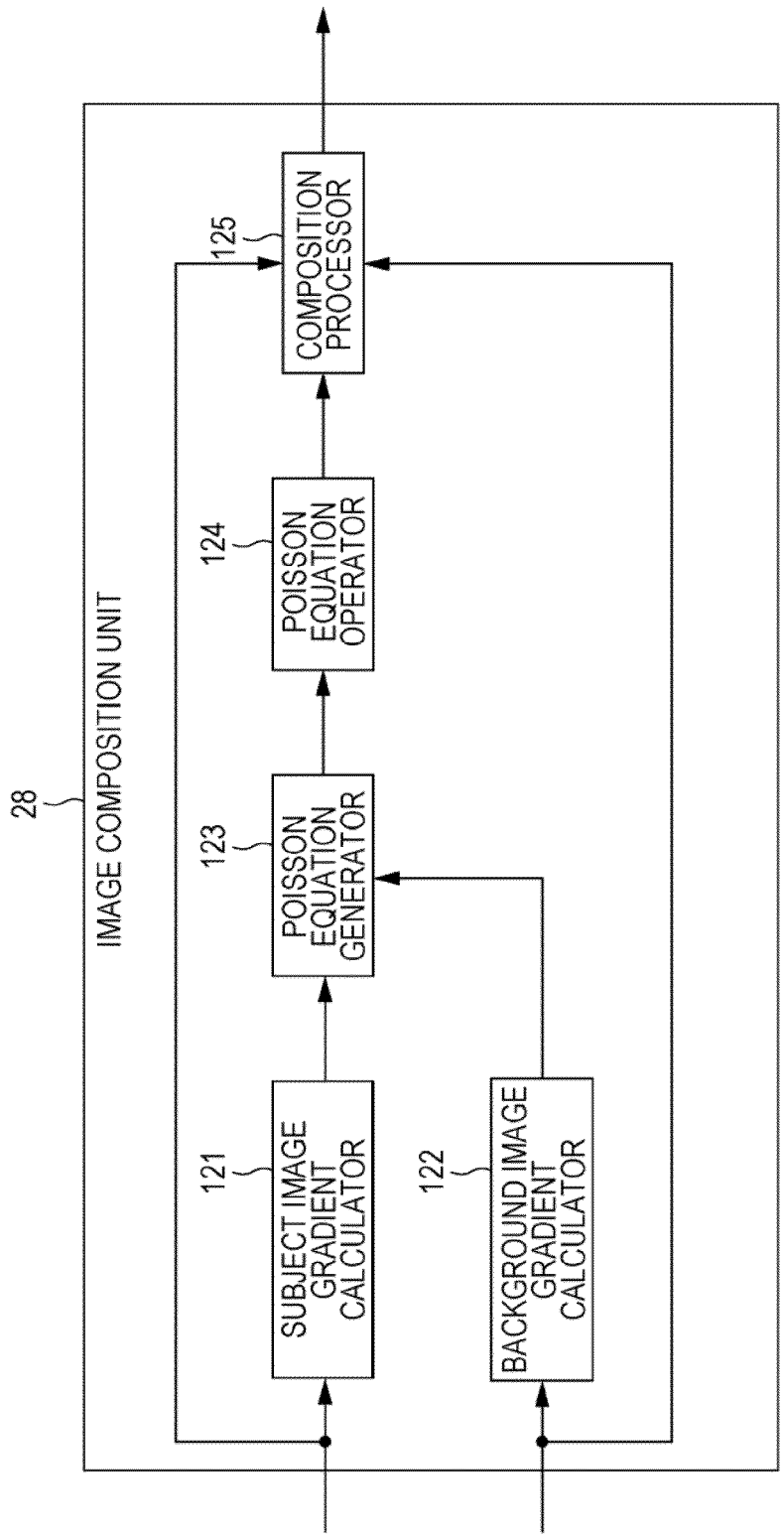
FIG. 8 is a block diagram showing a configuration example of an image composition unit.

Next, the configuration example of the image composition unit 28 will be described below with reference to FIG. 8.

The image composition unit 28 includes a subject image gradient calculator 121, a background image gradient calculator 122, a Poisson equation generator 123, a Poisson equation operator 124, and a composition processor 125.

The subject image gradient calculator 121 reads the subject cut image stored in the subject cut image storage unit 29, obtains a gradient of pixel values or luminance values in the subject image from a distribution of the pixel values or luminance values, and supplies the obtained gradient to the Poisson equation generator 123.

The background image gradient calculator 122 reads the background image stored in the background image storage unit 27, obtains a gradient of pixel values or luminance values in the background image from a distribution of the pixel values or luminance values, and supplies the obtained gradient to the Poisson equation generator 123.

The Poisson equation generator 123 generates a Poisson equation by using the operation result of the gradient of the subject cut image and the operation result of the gradient of the background image, and supplies the generated Poisson equation to the Poisson equation operator 124.

The Poisson equation operator 124 solves the Poisson equation supplied from the Poisson equation generator 123 through an arithmetical operation, obtains a distribution near the boundary that is generated as the result of the composition of the subject cut image and the background image, and supplies the operation result to the composition processor 125.

The composition processor 125 generates a composite image of the subject cut image and the background image from the operation result of the Poisson equation operator 124, and supplies the composite image to the display processor 31, to display the composite image on the display 32.

That is, the image composition unit 28 combines the subject cut image and the background image by so-called Poisson image composition processing.

Image Editing Processing

Figure 9:
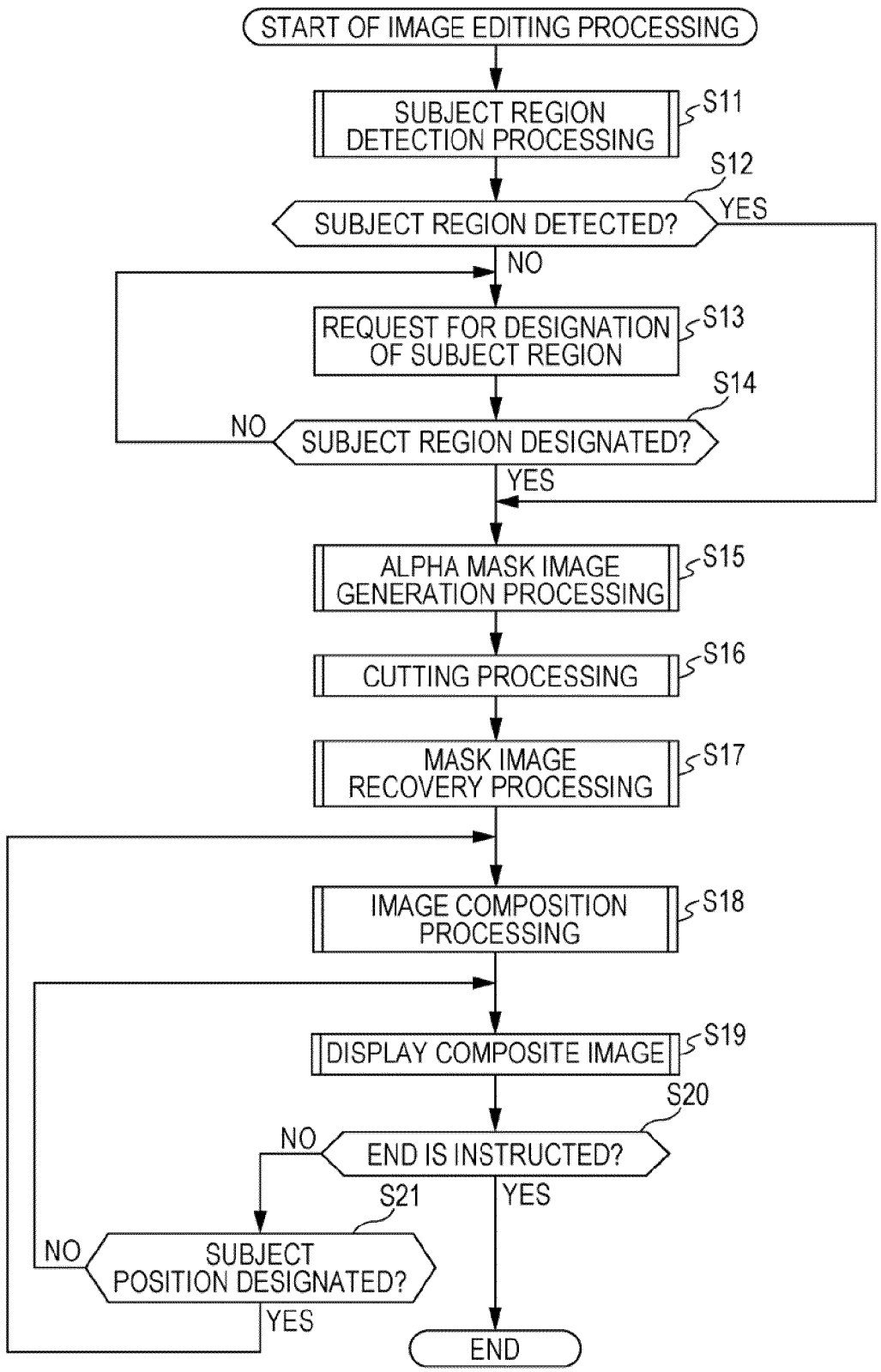
FIG. 9 is a flowchart explaining image processing by the image processing device in FIG. 1.

Next, image editing processing by the image processing device 11 in FIG. 1 will be described with reference to a flowchart in FIG. 9.

In step S11, the subject region detector 21 executes subject region detection processing, to detect a region where a subject is present from an input image, supply the detection result to the subject region judging unit 22 and to the display processor 31, and display the detection result on the display 32. At this time, the display processor 31 superimposes the subject region detection result on the input image, so that the display 32 displays the image as shown in the image P1 in FIG. 2. The detail of the subject region detection processing will be described later with reference to a flowchart in FIG. 10. It is to be noted that the subject detection result does not have to be displayed as long as it is enough to obtain the subject detection result.

In step S12, the subject region judging unit 22 acquires the processing result of the subject region detection processing supplied from the subject region detector 21, and judges whether a subject region in the input image is detected or not based on the processing result. If the region where the subject is present is not detected by the subject region detection processing, in step S13, the subject region judging unit 22 causes the display processor 31 to display a request on the display 32 to the user for an input of an auxiliary region that supplements the subject region. Further, the subject region judging unit 22 instructs the auxiliary input information adding unit 23 to receive the input of the auxiliary region that is added to the subject region in accordance with an instruction content from the instruction unit 33 corresponding to an operation content of the operation unit 34. Even if the subject region is detected, for example, when the subject region is insufficient for the image of the dog, which is a subject, as shown in the image P1 in FIG. 2, the user may determine that the subject region is not detected, and the user may add the information of the auxiliary region by an operation with the operation unit 34.

In step S14, the auxiliary input information adding unit 23 judges whether or not the auxiliary region that supplements the subject region in response to an instruction signal of the instruction unit 33 corresponding to an operation content of the operation unit 34 is input. In step S14, for example, if the operation unit 34 is operated, and the auxiliary region is input, but information indicative of the end of the input operation is not input, the processing in steps S13 and S14 is repeated and the image of the request for the input of the auxiliary region is continuously displayed on the display 32. In step S14, as indicated by the circles in the image P2 in FIG. 2, if the auxiliary region is added so that the entire region of the dog of the subject is the subject region by the operation with the operation unit 34 and the end is instructed, it is considered that the subject region is designated, and the processing goes to step S15. It is to be noted that the processing in steps S13 and S14 may be performed after cutting processing in step S16 (described later). In other words, the auxiliary input may be provided for the cutting result.

In step S15, the auxiliary input information adding unit 23 supplies the information of the added auxiliary region and the subject detection result to the subject region setting unit 24. The subject region setting unit 24 updates the subject region by adding the auxiliary region to the subject region, which is the subject detection result, and supplies the updated subject region to the subject cutting unit 25. The subject cutting unit 25 controls the alpha mask image generator 41 to cause the alpha mask image generator 41 to execute alpha mask image generation processing and hence to generate an alpha mask image.

In step S12, if the subject region is detected, the processing in steps S13 and S14 is skipped, and in step S15, the subject region judging unit 22 supplies the detection result of the subject region to the subject cutting unit 25. The subject cutting unit 25 controls the alpha mask image generator 41 based on information of the subject region as the processing result of the subject region detection processing to execute alpha mask image generation processing and hence to generate the alpha mask image. The detail of the alpha mask image generation processing will be described later with reference to a flowchart in FIG. 11.

In step S16, the subject cutting unit 25 controls the cutting unit 42 to execute cutting processing using the alpha mask image and the input image, so that the subject region is cut from the input image, and to store the subject region as a subject cut image in the subject cut image storage unit 29.

Also, the cutting unit 42 causes the mask image recovery unit 26 to output a mask image, in which a region obtained by cutting the subject cut image from the input image by the cutting processing serves as a mask region. The detail of the cutting processing will be described later with reference to a flowchart in FIG. 16.

In step S17, the mask image recovery unit 26 executes mask image recovery processing, in which the mask region obtained by cutting the subject cut image from the input image is recovered based on the input image, and a background image is generated. The mask image recovery unit 26 stores the generated background image in the background image storage unit 27. The detail of the mask image recovery processing will be described later with reference to a flowchart in FIG. 19.

In step S18, the image composition unit 28 executes image composition processing by using the subject cut image in the subject cut image storage unit 29 and the background image in the background image storage unit 27, combines the subject cut image with the background image, and outputs the composite image to the display processor 31. Also, the image composition unit 28 outputs the composite image to an external device through the output unit 30 in accordance with an operation content of the operation unit 34. The detail of the image composition processing will be described later with reference to a flowchart in FIG. 20.

In step S19, the display processor 31 causes the display 32 to display the composite image supplied from the image composition unit 28.

In step S20, the image composition unit 28 judges whether the end of the image editing processing is instructed or not through an operation with the operation unit 34. For example, if the instruction for the end is not made, the processing goes to step S21.

In step S21, the image composition unit 28 judges whether or not the position of the subject cut image on the image is designated again and moved by an operation of the subject cut image through an operation with the operation unit 34. For example, as shown in the image P4 in FIG. 2, if the subject, which is the dog, is moved from the subject cut image D1 to the subject cut image D2 by an operation with the operation unit 34, it is considered that a movement occurs, and the processing returns to step S18, in which the image composition processing is executed for the moved position. Then, by the processing in step S19, a composite image, in which the subject is moved to the subject cut image D2 as shown in the image P5 in FIG. 2, is generated and displayed on the display 32.

In contrast, in step S20, if the end of the processing is instructed, the processing is ended.

When the subject region in the input image is set by the above-described processing, the subject can be freely moved on the image as the subject cut image. Also, since the mask region, which is generated in the input image when the subject region image is moved, is recovered, the cut subject cut image can be combined at a desirable position.

Subject Region Detection Processing

Figure 10:
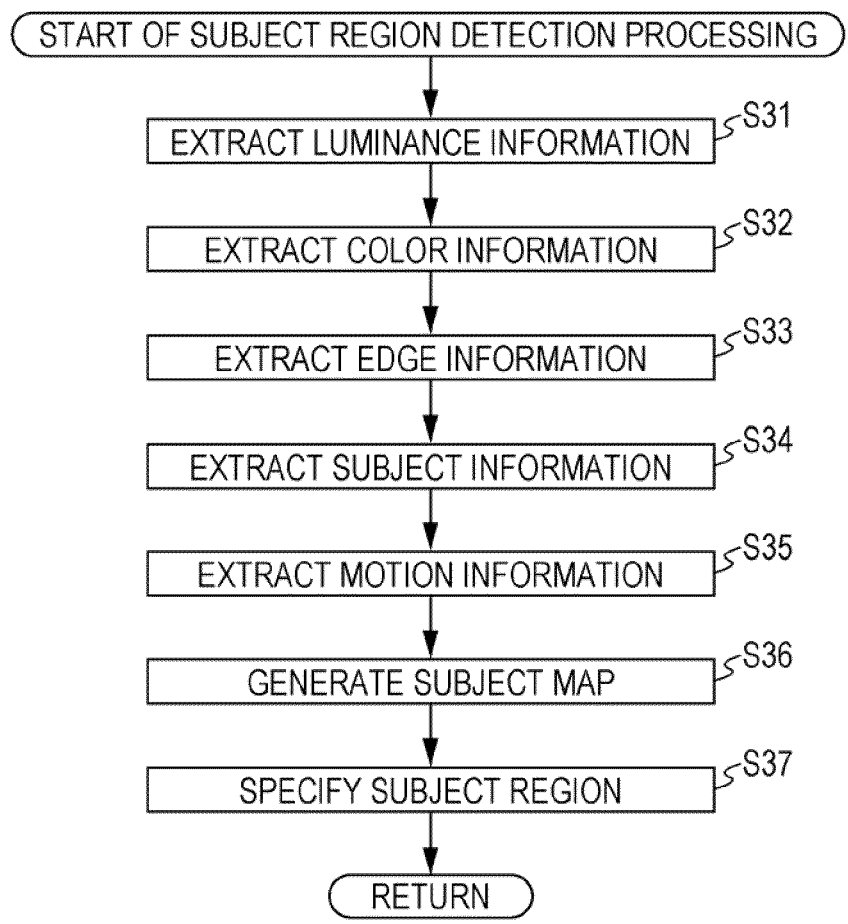
FIG. 10 is a flowchart explaining subject region detection processing by the subject region detector in FIG. 3.

Next, the subject region detection processing will be described with reference to the flowchart in FIG. 10.

In step S31, the luminance information extractor 51 performs luminance information extraction processing, in which a luminance information map is generated based on the supplied input unit, and supplies the generated luminance information map to the subject map generator 56. In step S32, the color information extractor 52 performs color information extraction processing, in which a color information map is generated based on the supplied input image, and supplies the generated color information map to the subject map generator 56.

In step S33, the edge information extractor 53 performs edge information extraction processing, in which an edge information map is generated based on the supplied input image, and supplies the generated edge information map to the subject map generator 56. In step S34, the subject information extractor 54 performs subject information extraction processing, in which a subject information map is generated based on the supplied input image, and supplies the generated subject information map to the subject map generator 56. In step S35, the motion information extractor 55 performs motion information extraction processing, in which a motion information map is generated based on the supplied input image, and supplies the generated motion information map to the subject map generator 56.

To be more specific, the motion information extraction processing is not performed if input images that are temporarily continuously captured are not supplied to the motion information extractor 55.

In step S36, the subject map generator 56 generates a subject map by adding the luminance information map to the motion information map supplied from the luminance information extractor 51 to the motion information extractor 55 together with weights, and supplies the generated subject map to the subject region specifying unit 57.

For example, the subject map generator 56 linearly combines the information maps by using information weights Wb that are weights previously obtained respectively for the information maps. That is, when it is assumed that a predetermined pixel in the information map obtained by the linear combination is a target pixel, the pixel value of the target pixel is the total sum of values obtained by multiplying pixel values of pixels of the respective information maps at the same position as the position of the target pixel, by information weights Wb for the respective information maps.

Next, the subject map generator 56 applies arithmetical processing with a sigmoid function to the pixel value of each pixel in the information map (hereinafter, also referred to as linear combination information map) obtained by the linear combination.

To be more specific, the subject map generator 56 previously holds a conversion table that is obtained by tabulation of the sigmoid function. The conversion table includes a predetermined value as an input, and an output value that is obtained by substituting the predetermined value into the sigmoid function. If the linear combination information map is converted by the conversion table, an information map similar to that obtained when the linear combination information map is converted with the sigmoid function can be obtained.

For example, the sigmoid function is considered as a hyperbolic tangent function shown in Expression (1) as follows:

$$f(x) = a \times \tan h(x \times b) \qquad (1),$$

where, a and b are predetermined constants, and x is a pixel value of a pixel in the linear combination information map that is to be converted.

When the hyperbolic tangent function is the sigmoid function, the conversion table is considered such that the range of the input value x is limited to a range from −2 to 2, and the input value x is obtained by discretization on a $\frac{1}{128}$ basis. With this conversion table, if the input value x is smaller than −2, the input value x is handled as −2, and if the input value x is larger than 2, the input value x is handled as 2. Further, with the conversion table, larger the input value x, larger an output value f(x).

The subject map generator 56 converts the linear combination information map by changing a pixel value of a pixel in the linear combination information map from a pixel value x (an input value x) to an output value f(x) corresponding to the pixel value x. That is, the subject map generator 56 considers the linear combination map converted by using the conversion table as the linear combination information map to which the arithmetical processing with the sigmoid function is applied.

As described above, by converting the linear combination information map by using the conversion table, as compared with a case in which the conversion is performed with the actual use of the sigmoid function, the conversion for the linear combination information map can be further easily and quickly performed.

Further, the subject map generator 56 multiplies a pixel value of each pixel in the linear combination information map converted with the conversion table, by a subject weight Wc, which is a weight previously obtained for each pixel, and thus the subject map is obtained.

In particular, if a pixel of interest in the subject map that is to be obtained is assumed as a target pixel, a value obtained by multiplying a pixel value of a pixel located at the same position as the target pixel in the converted linear combination information map, by the subject weight Wc is a pixel value of the target pixel.

To be more specific, the color information map used for the generation of the subject map includes a color information map of Cr and a color information map of Cb, and the edge information map includes edge information maps in directions at 0, 45, 90, and 135 degrees. Also, the information weight Wb and the subject weight Wc are previously obtained through learning.

When the subject map is generated in this way, the subject map is supplied from the subject map generator 56 to the subject region specifying unit 57, and the processing goes to step S37.

In step S37, the subject region specifying unit 57 specifies the region of the subject on the supplied input image, by using the subject map supplied from the subject map generator 56.

For example, as the pixel value of the pixel in the subject map is larger, the region of the pixel in the input image at the same position as the pixel is more likely the region of the subject. In this case, the subject region specifying unit 57 detects a region including pixels being adjacent to each other, having pixel values equal to or larger than a predetermined threshold, and having a predetermined area (a predetermined number of pixels) from the subject map, and considers that the region in the input image corresponding to the detected region is a region including the subject.

When the subject region specifying unit 57 detects the region including the subject from the input image, the subject region specifying unit 57 outputs the detection result to subsequent processing, and ends the subject region specification processing.

Alternatively, the subject region specifying unit 57 may apply predetermined processing for the input image by using the detection result of the subject region and output the result.

In this way, the subject map is generated from the input image, and the region of the subject in the input image is specified by using the subject map.

Alpha Mask Image Generation Processing

Next, the alpha mask image generation processing will be described with reference to the flowchart in FIG. 11.

In step S51, the input image acquiring unit 71 judges whether an input image I is supplied or not, and repeats the similar processing until an input image is supplied. If the input image I is input, the processing goes to step S52.

In step S52, the input image acquiring unit 71 supplies the input image I to the binary mask image generator 72, the extension tri-map image generator 73, and the alpha mask image generator 74. The binary mask image generator 72 generates a binary mask image B from the input image I by dividing a foreground object image, which is a subject image, based on subject region setting information supplied from the subject region judging unit 22 or the subject region setting unit 24, and supplies the binary mask image B to the extension tri-map image generator 73.

In short, for example, label=1 is set for the region of the foreground object image which is the subject image. It is to be noted that an undetermined region is not set at the boundary between the foreground object image, which is the subject image, and a background image.

In step S53, the extension tri-map image generator 73 sets an undetermined region with a predetermined width at a position near the boundary between the foreground object image and the background image. For example, if the width for the undetermined region is w (if the width corresponds to a width by a number w of pixels), a label "−1" is applied to the pixel in the undetermined region. At this time, the extension tri-map image generator 73 obtains the undetermined region by two-step processing including processing in the horizontal direction and processing in the vertical direction for all pixels in the binary mask image B.

In particular, in the first step, the extension tri-map image generator 73 receives the binary mask image B as an input, and checks whether or not a pixel with a label different from that of a processing target pixel at the center is present in a range of left w pixels and right w pixels around the processing target pixel. For example, if the pixel with the label different from that of the processing target pixel is present, the extension tri-map image generator 73 considers that the processing target pixel is included in the undetermined region, and applies a label of "−1."

In contrast, if the pixel with the label different from that of the processing target pixel at the center is not present in the range of left w pixels and right w pixels around the processing target pixel, the extension tri-map image generator 73 applies the label of the processing target pixel without change. With this processing, the extension tri-map image generator 73 holds an intermediate tri-map image T1 obtained by the processing in the horizontal direction.

Further, in the second step, the extension tri-map image generator 73 receives the intermediate tri-map image T1 as an input, and checks whether or not a pixel with a label different from that of the processing target pixel is present in a range of upper w pixels and lower w pixels around the processing subject pixel, like the processing in the horizontal direction. For example, if the pixel with the label different from that of the processing target pixel is present, the extension tri-map image generator 73 considers that the processing target pixel is included in the undetermined region, and puts a label of "−1," updates the tri-map image T1, and generates a tri-map image T.

With this processing, the extension tri-map image generator 73 generates the tri-map image T by applying the label of the undetermined pixel to the pixel with the different label in the range of the predetermined width w×2 in the horizontal and vertical directions for each pixel of the binary mask image B. As the result, the tri-map image T having the certain undetermined region set in the region near the boundary between the region of the foreground object image, which is the subject image, and the region of the background image is generated.

The extension tri-map image generator 73 supplies the tri-map image T to the alpha mask image generator 74, the tri-map image updating unit 75, and the settlement judging unit 76.

In step S54, the alpha mask image generator 74 generates an alpha mask image A based on the tri-map image T by, for example, robust matting (see Jue Wang, M F Cohen, Optimized Color Sampling for Robust Matting, Computer Vision and Pattern Recognition, 2007), and supplies the alpha mask image A to the tri-map image updating unit 75.

In step S55, the tri-map image updating unit 75 executes the tri-map image update processing, in which the tri-map image T is updated into a tri-map image T', and supplies the updated tri-map image T' to the settlement judging unit 76.

The tri-map image update processing will now be described.

In a first step, an edge flow vector is obtained for each pixel.

In particular, the alpha mask image A is converted into a luminance image, and edges in the horizontal and vertical directions are detected by using a horizontal Sobel filter and a vertical Sobel filter. Accordingly, for the horizontal direction of the image, an edge gradient flow vertical to the edge (a horizontal-direction component of a differential vector) is obtained. Also, for the vertical direction of the image, an edge gradient flow horizontal to the edge (a vertical-direction component of a differential vector) is obtained.

Next, the edge gradient flow vector is rotated clockwise by 90 degrees, and hence an edge tangent flow vector is generated. This edge tangent flow vector includes a horizontal component and a vertical component of a normalized vector (a vector having a size of 1) and information of the size of the vector. In the following description, the edge tangent flow vector is merely referred to as an edge flow vector.

The edge flow vector is non-linearly smoothened, and processing is made such that a weak edge follows a pronounced edge around the weak edge while the pronounced edge is held without changing the size of each vector. Thus, an edge flow vector whose vector direction is smoothly changed is obtained.

In particular, an edge flow vector including an element (tx, ty) of a normalized vector and information of the length (mag) of the vector is obtained for each pixel (px, py).

Further, when the edge flow vector is obtained, a size array svec is set for sampling with an ellipsoidal shape.

Figure 12:
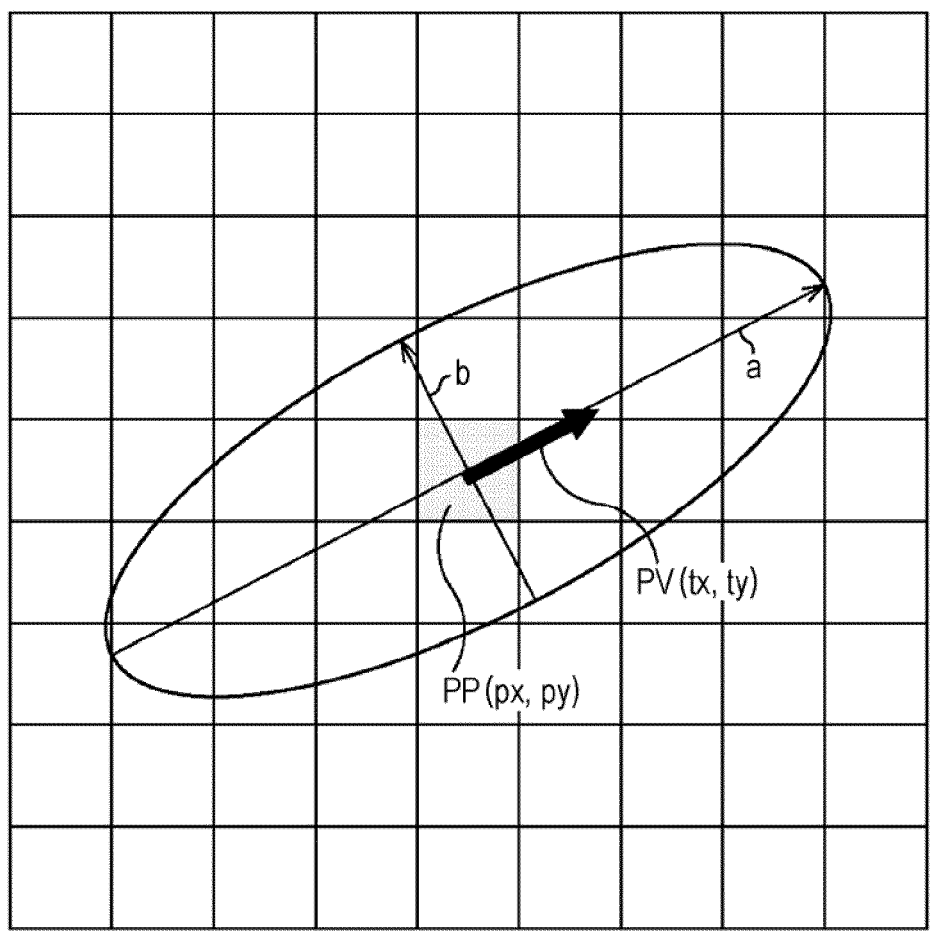
FIG. 12 is an illustration explaining the alpha mask image generation processing.

Sampling with an ellipsoidal shape is applied to, for example, pixels within an ellipsoidal shape, whose center is a pixel PP (px, py) on a tri-map image T in FIG. 12, which has a long radius a of 3×w and a long radius b of w, and whose major axis is arranged along the edge flow vector (tx, ty) at the pixel position. Then, by previously calculating the number of pixels for sample points that are set in the major-axis direction in correspondence with the position of the minor axis, the size array svec is set. The size is calculated by Expression (2) as follows:

$$x=\sqrt{((1-y2/b2) \times a2)} \quad (2).$$

It is to be noted that the lengths of the major axis and the minor axis do not have to be the aforementioned lengths, and may be desirably set.

Figure 13:
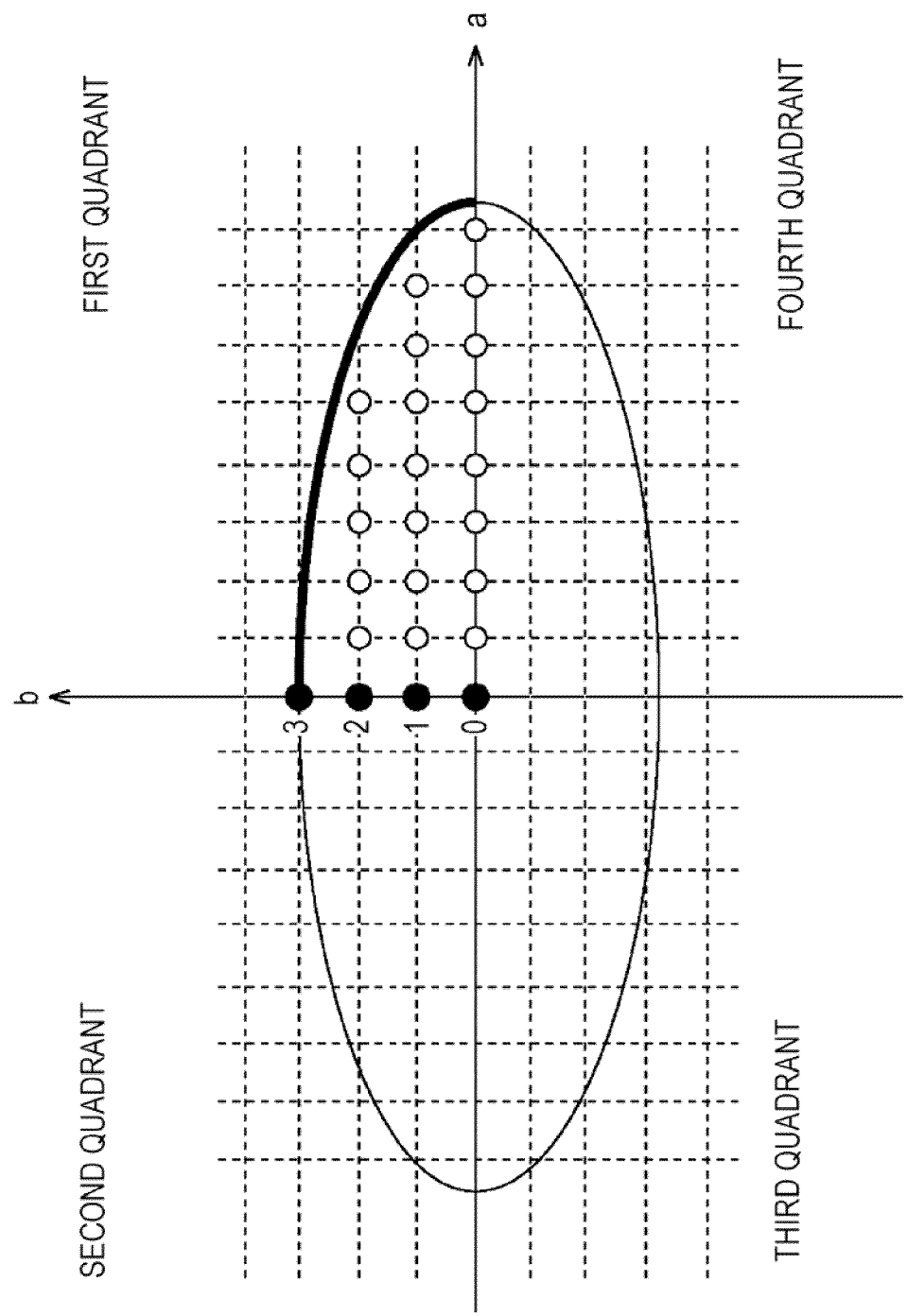
FIG. 13 is an illustration explaining the alpha mask image generation processing.

To be more specific, it is assumed that the sample points set in the size array svec are arranged at the positions of coordinates of integers as shown in FIG. 13. With regard to a first quadrant, for example, at index=0 corresponding to b=0 on the minor axis, 8 sample points indicated by white dots are present. Thus, the size is 8. Similarly, at index=1 corresponding to b=1 on the minor axis, 7 sample points are present, and hence the size is 7. Further similarly, at index=2 corresponding to b=2 on the minor axis, 5 sample points are present, and hence the size is 5. At index=3 corresponding to b=3 on the minor axis, 0 sample point is present, and hence the size is 0.

Figures 14, 15:
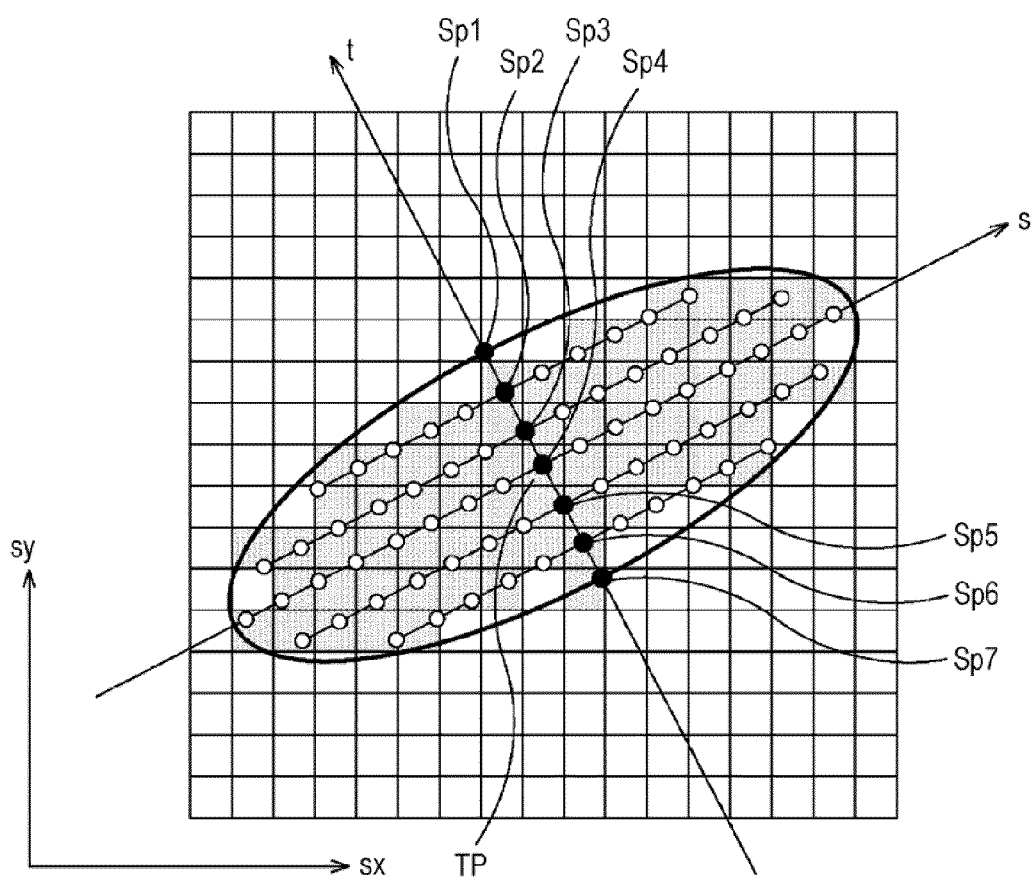
FIG. 14 is an illustration explaining the alpha mask image generation processing.
FIG. 15 is an illustration explaining the alpha mask image generation processing.

The relationship between the index and the size in the first quadrant is set as, for example, a size array svec as shown in FIG. 14.

If unprocessed pixels are present in the alpha mask image A or the tri-map image T, one of the unprocessed pixels is set as a subject target pixel (px, py).

Further, if the pixel as the processing target in the alpha mask image A has a transparency α that is larger than a minimum value Th_min and is smaller than a maximum value Th_max, that is, if the pixel is not belonging to the foreground object image or the background image, the label update processing is executed. With this label update processing, the label of the pixel in the ellipsoidal range specified by the processing target pixel in the tri-map image T is updated to the undetermined pixel.

In particular, the label update processing is processing as follows.

A counter t in the minor-axis direction is set to a value obtained by assigning a negative sign to a size w of the short axis (t=−w).

Next, it is judged whether or not the counter t is w or smaller, which is the size of the minor axis. For example, if the counter t is w or smaller, the pixel position (bx, by) in the ellipsoidal range to be set as the undetermined pixel is determined through calculation with Expression (3) for the processing target pixel (px, py) in the tri-map image T, as follows:

$$bx=px+tx \times t,$$

$$by=py+ty \times t \quad (3),$$

where, bx and by are, for example, coordinates (bx, by) of a sample point (black dot) on a t-axis in the ellipsoidal range in FIG. 15 determined based on the processing target pixel (px, py); tx and ty are an sx-direction component and an sy-direction component of the edge flow vector at the processing target pixel (px, py), and t is a value of the counter t.

That is, the sample points Sp7, Sp5, Sp4 . . . , and Sp1 in FIG. 15 are successively acquired in accordance with the value of the counter t. In FIG. 15, the processing target pixel (px, py) in FIG. 15 is a pixel TP indicated as a square cell, to which the sample point Sp4 belongs, on the tri-mask image T.

A negative sign is applied to a size (=svec[abs(t)]) whose index is set in accordance with an absolute value of the counter t from among the size array svec, and the value is set as a counter s. In other words, a value with a minus sign applied to a size corresponding to a value of index set with the counter t from among the sizes set in the major-axis direction is set as the value of the counter s.

Further, the counters s and t indicate coordinates of the s-axis and t-axis (axes corresponding to the flow vector (tx, ty)) of the sample points corresponding to the positions of pixels that should be set as the undetermined pixels. Accordingly, referring to FIG. 15, it is judged whether or not the counter s is a maximum value or smaller in the ellipsoidal range from among the coordinates of the s-axis of the sample point set on the line orthogonal to the t-axis (or the line parallel to the s-axis) at the position currently corresponding to the counter t.

For example, if the counter t is 0, referring to FIG. 13, the size indicated by svec[0] corresponding to index=0 is 8. Hence, referring to FIG. 15, it is judged whether or not the counter s is in a range up to the most upper right sample point on the x-axis, i.e., whether or not the counter s is at a coordinate position on the left in the s-axis direction with respect to the sample point (s, t)=(8, 0) with the maximum coordinate of the s-axis in the range set by the ellipsoidal shape.

In contrast, if the counter s is smaller than the size array svec[abs(t)], the processing target position (sx, sy) in the ellipsoidal range is determined through an arithmetical operation with Expression (4) as follows:

$$sx = \text{round}(bx + tx \times s),$$

$$sy = \text{round}(by + ty \times s) \quad (4).$$

Herein, a round(X) indicates dropping the fractional portion of a number X, and a processing target position (sx, sy) represents coordinates of a pixel indicated by a square cell including a sample point (white dot) set along the s-axis in FIG. 15. That is, referring to FIG. 15, pixel coordinates in the sx-sy space on the tri-map image T corresponding to the sample points in the st space are determined.

Then, the label of a pixel of the tri-map image T at a pixel position of coordinates (sx, sy) corresponding to a sample point (s, t) is set to "−1" indicative of an undetermined pixel.

Further, the counter s is incremented by 1, and the update is repeated until it is judged that the counter s is equal to or smaller than the size array svec[abs(t)].

If it is judged that the counter s is not equal to or smaller than the size array svec[abs(t)], i.e., if the counter s exceeds the ellipsoidal range set for the sample points, the counter t is incremented by 1, and the update is repeated until it is judged that the counter t is not equal to or smaller than w.

In summary of the above processing, referring to FIG. 15, if the processing target pixel on the tri-map image T is a pixel TP corresponding to a sample point Sp4 in the ellipsoidal range, the ellipsoidal range is set as a processing target range. Then, the counter t that manages the coordinates in the minor-axis direction set the sample points on the t-axis successively in order of Sp7, Sp6 . . . , and Sp1. Further, the sample points on the s-axis corresponding to the positions on the t-axis are successively set from the left to the right, and the labels of pixels (pixels indicated by colored square cells in FIG. 15) on the tri-map image T, to which the set sample points belong, are updated to "−1" indicative of undetermined pixels.

As the result, the pixels present in the ellipsoidal range for the processing target pixel on the tri-map image T, the range which has a predetermined size, has a major axis extending along the edge flow vector of the processing target pixel, and is centered at the processing target pixel, are set as undetermined pixels. Accordingly, pixels in a peripheral range, which are weighted depending on the edge flow vector, from among pixels, which obviously do not belong to the foreground object image or the background image on the tri-map image T, can be set as undetermined pixels.

Here, the description returns to the tri-map image update processing.

If the transparency α of the processing target pixel on the alpha mask image A is not larger than the minimum value Th_min or not smaller than the maximum value Th_max, the label update processing is skipped. In other words, if the pixel on the alpha mask image is a pixel that belongs to the region of the foreground object image or a pixel that belongs to the background image, the label update processing is skipped.

With this processing, from among pixels of the alpha mask image A, the labels as undetermined pixels are set only for pixels that do not belong to the region of the foreground object image or to the background image.

More specifically, the label of pixels on the tri-map image T corresponding to the pixels that do not belong to the foreground object image or the background image on the alpha mask image A are updated to the labels of undetermined pixels in the ellipsoidal range set with the edge flow vector of the processing target pixel.

Figure 11:
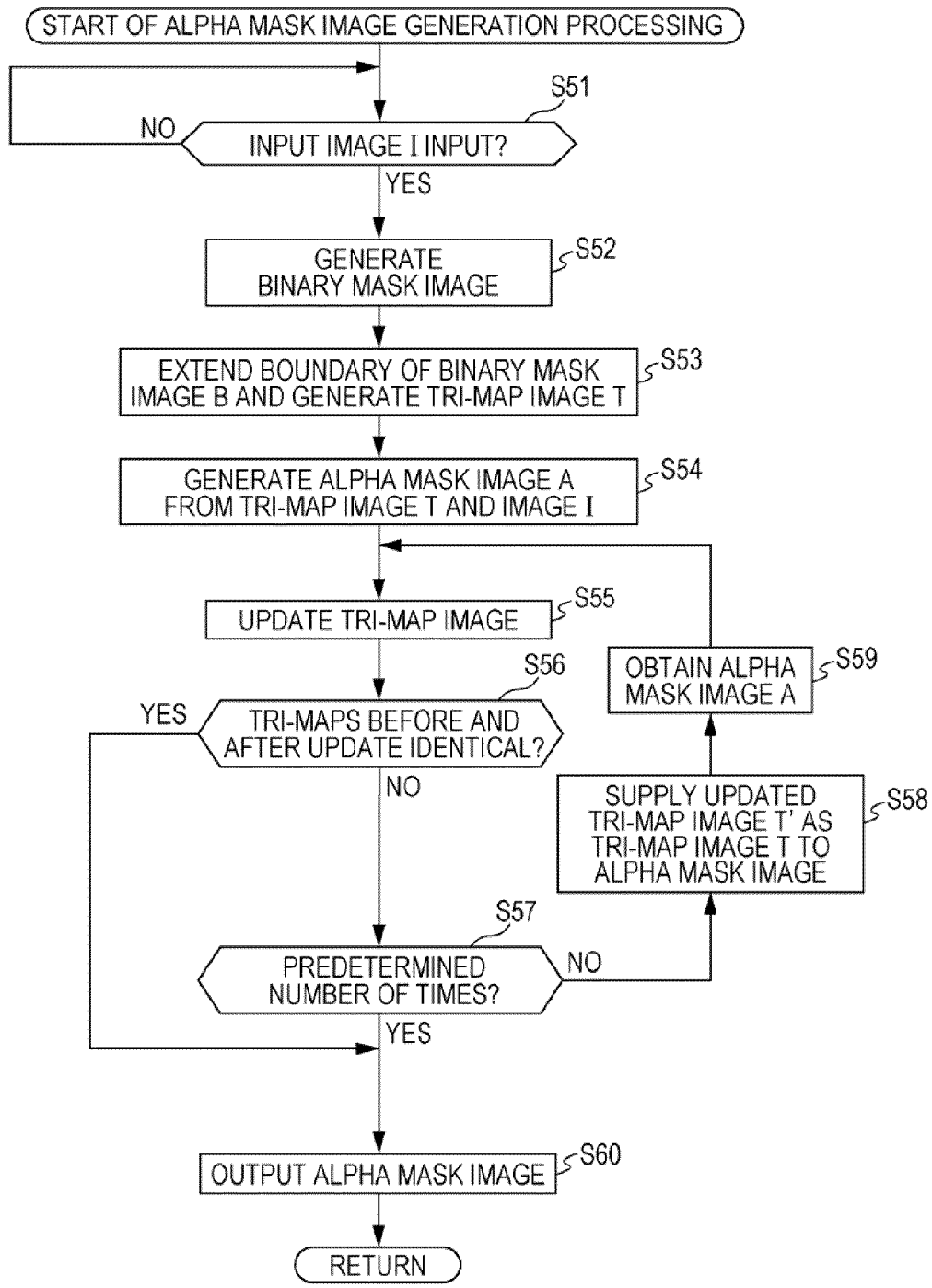
FIG. 11 is a flowchart explaining alpha mask image generation processing.

Here, the description returns to the flowchart in FIG. 11.

In step S56, the settlement judging unit 76 compares the tri-map image T before the update by the tri-map image updating unit 75 with the tri-map image T' updated by the tri-map image updating unit 75, and judges whether these tri-map images are identical with each other or not, or substantially identical with each other or not. For example, if it is judged that these images are not identical or substantially identical, the processing goes to step S57.

In step S57, the settlement judging unit 76 judges whether the number of times of processing from step S54 to step S57 reaches a predetermined number or not. If the settlement judging unit 76 judges that the number of times of processing does not reach the predetermined number, the processing goes to step S58.

In step S58, the settlement judging unit 76 stores the updated tri-map image T' as the latest tri-map image T, and supplies the tri-map image T to the alpha mask image generator 74.

In step S59, the alpha mask image generator 74 applies the robust matting processing to the tri-map image T supplied from the settlement judging unit 76, so as to generate a new alpha mask image A and supplies the alpha mask image A to the tri-map image updating unit 75. Then, the processing returns to step S55.

In other words, the processing from step S55 to step S59 is repeated until the tri-map image T before the update by the tri-map image updating unit 75 and the updated tri-map image T' become identical or substantially identical with each other, or the number of times of processing reaches the predetermined number. At this time, in the processing after the initial processing, the alpha mask image generator 74 generates the alpha mask image A by using the tri-map image T that is replaced with the tri-map image T' updated last, instead of the tri-map image T generated by the extension tri-map image generator 73.

After the processing from step S55 to step S59 is repeated, if it is judged that the tri-map image T before the update and the updated tri-map image T' are identical or substantially identical with each other in step S56, the processing goes to step S60. Alternatively, after the processing from step S55 to step S59 is repeated, if it is judged that the number of times of processing from step S55 to step S59 reaches the predetermined number in step S57, the processing goes to step S60 similarly.

In step S60, the settlement judging unit 76 supplies the alpha mask image A, which has been transmitted simultaneously with the tri-map image T', to the output unit 77. The output unit 77 outputs the transmitted alpha mask image A.

In this way, the processing for setting the pixels in the predetermined ellipsoidal range, the pixels which do not belong to the foreground object image or the background image, to the undetermined pixels is repeated based on the transparency α on a pixel basis of the alpha mask image A.

By repeating the processing, for example, if an ellipsoidal range initially set by sampling with the ellipsoidal shape is small, as the tri-map image update processing is repeated, the range for setting undetermined pixels typically becomes large.

However, as the processing from step S55 to step S59 is repeated, the region with the undetermined pixels of gray color becomes large. If the processing is repeated a predetermined number of times (for example, about 20 times), the alpha mask image A for updating the tri-map image T becomes not substantially changed even through the tri-map image T is updated based on the alpha mask image A. As mentioned above, if the tri-map image is not changed before and after the update, it is considered that the range of the transparency α not belonging to the foreground object image or the background image in the alpha mask image A is proper since the transparency α is an intermediate value between the minimum value and the maximum value. That is, the setting range of the undetermined pixels of the tri-mask image T is proper.

Thus, by setting the tri-mask image T, generating the alpha mask image A from the tri-mask image T by robust matting or the like, and repeating the processing for the update to the tri-mask image T' based on the alpha mask image A and the edge flow vector, the optimum undetermined region can be set.

Image Cutting Processing

Next, the cutting processing will be described with reference to the flowchart in FIG. 16.

In step S91, the input image acquiring unit 81 and the alpha mask image acquiring unit 82 respectively judge whether an input image I and an alpha mask image A are supplied or not. The similar processing is repeated until the input image I and the alpha mask image A are supplied.

In step S92, the input image acquiring unit 81 supplies the input image I to the determined value map generator 83 and the estimated foreground color image generator 85. Also, the alpha mask image acquiring unit 82 supplies the input alpha mask image A to the determined value map generator 83, the pixel weight map generator 84, the estimated foreground color image generator 85, and the Laplacian matrix generator 86.

Further, the determined value map generator 83 generates a determined value map image S from the alpha mask image A. The determined value map image S includes a pixel of a first predetermined pixel value determined as the foreground object image or the background image, and a pixel of a second predetermined pixel value not belonging to any of the above pixels.

To be more specific, the determined value map generator 83 generates a determined value map image S by setting a pixel value to, for example, 1 for a pixel having a transparency α defined by α=1 or α=0 as a determined pixel whose color is determined in the foreground object image, and setting a pixel value to 0 for the other undetermined pixel. Also, from among the pixels set as the determined pixels, the determined value map generator 83 sets a pixel having a transparency α defined by α>0.5 to a foreground determined pixel (a pixel belonging to a subject image), and sets a pixel having a transparency α of α<0.5 to a background determined pixel (a pixel belonging to an image other than the subject image).

The determined pixel is not limited to a pixel of α=1 or α=0, and may be defined by a certain threshold. For example, thresholds of α>0.98 and α<0.02 may be used. Also, the undetermined region including the undetermined pixel may be extended to the determined region by about one to several pixels to increase accuracy of subsequent processing. With the processing, for example, even if colors of a determined pixel and an undetermined pixel are calculated as an intermediate color because an input image I is an image obtained by upsampling, the color of a foreground object image can be accurately calculated without color blur.

In step S93, the pixel weight map generator 84 generates a pixel weight map image Ds from the determined value map image S and the alpha mask image A, and supplies the generated pixel weight map image Ds to the energy function generator 87. To be more specific, the pixel weight map generator 84 sets the pixel value of the alpha mask image A corresponding to a pixel of the undetermined region in the determined value map image S, i.e., sets the transparency α as a weight of the pixel, and generates the pixel weight map image Ds. By adjustment of the value corresponding to each pixel of the pixel weight map image Ds, the characteristic of an energy function E (described later) is changed. For example, as a value corresponding to each pixel of the pixel weight map image Ds is larger, an energy function E is set such that a foreground color image close to an estimated foreground color image is more likely obtained. In contrast, as a value corresponding to each pixel of the pixel weight map image Ds is smaller, the value becomes closer to a value supplemented by a pixel value of the adjacent foreground object image. Hence, pixel values of the foreground object image having smooth continuity can be obtained.

Herein, a weight for each pixel of the pixel weight map image Ds uses a transparency α ($0 \leq \alpha \leq 1$) of each pixel; however, a value set as a weight may be other value.

In step S94, the estimated foreground color image generator 85 executes estimated foreground color image generation processing, in which an estimated foreground color image F^ is generated from the input image I, the alpha mask image A, and the determined value map image S, and supplies the generated estimated foreground color image F^ to the energy function generator 87.

The estimated foreground color image generation processing will now be described.

Differential processing is applied to an α value of each pixel of the alpha mask image A by using a Sobel filter, so that a differential image A' defined by a differential value Δα is generated.

Then, based on the differential image A', differential values Δα for each pixel in the undetermined region of the determined value map S, the pixel which is on all paths to all determined pixels of the foreground object image at the boundary with respect to the determined region, are integrated. For each pixel, a path with the smallest integral value of the differential values Δα is assumed as a shortest path to the determined pixel, and the pixel position of the determined pixel passing through the path is read.

In particular, referring to FIG. 17, differential values Δα of pixels on all paths PATH from a pixel Pd in an undetermined region to a plurality of determined pixels Pu at the boundary are integrated, and a determined pixel Pu with a minimum value is retrieved through an arithmetical operation with Expression (5) as follows:

$$d(p_d, p_u) = \min_{PATH_{pd,pu}} \int_0^1 |\Delta\alpha| dp, \quad (5)$$

where, d(Pd, Pu) is of the determined pixel Pu with the minimum integral value from among the integral values of absolute values of differential values Δα of all pixels present on paths PATH from the pixel Pd in the undetermined region to the determined pixels Pu at the boundary with respect to the determined region. A distance of each path defined by an integral value of differential values Δα is so-called geodesic distance. Also, each path PATH is set by successively coupling adjacent pixels as nodes in the relationship of 8 adjacent pixels. That is, the adjacent pixels that the pixel TP can choose as the next paths are pixels P1 to P8 in 8 directions, i.e., leftward, rightward, upward, downward, a lower right direction, an upper right direction, an upper left direction, and a lower left direction.

Figure 17:
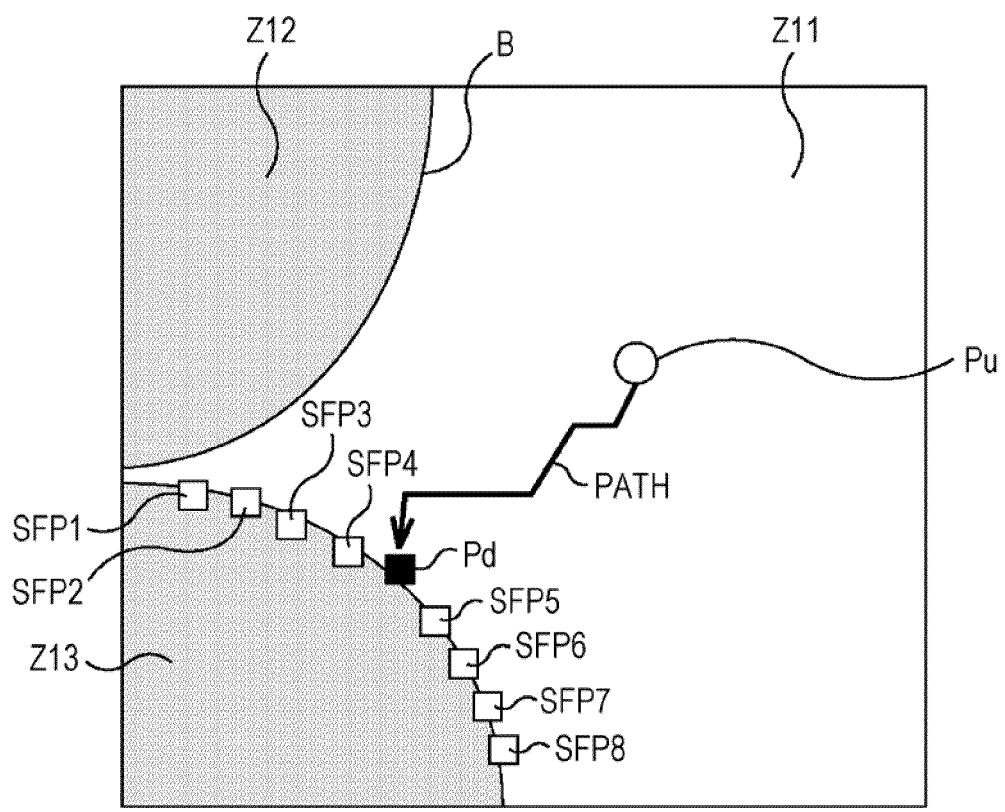
FIG. 17 is an illustration explaining the cutting processing.

In FIG. 17, a region Z11 is an undetermined region including an undetermined pixel, and regions Z12 and Z13 are determined regions including determined pixels of a foreground object image. Also, a boundary B is the boundary between the undetermined region and the determined region. White pixels SFP1 to SFP8, and a black pixel Pd are determined pixels on the boundary B.

Also, in a distance map image M, in which the distance (a geodesic distance) to the nearest determined pixel obtained as the shortest path is set as a pixel value, for example, the black color is assigned to a determined pixel, a brighter color is assigned depending on the distance, and the white color is assigned to the farthest pixel.

Further, undetermined pixels are respectively associated with information of pixel positions retrieved as the shortest paths, and thus, a nearest foreground pixel map image N is generated.

Then, based on the nearest foreground pixel map image N, pixel values of determined pixels in the input image I at the pixel positions respectively set for the undetermined pixels are read and set as pixel values of the undetermined pixels. Thus, an estimated foreground color image F^ is generated. In particular, for example, referring to FIG. 17, the pixel value of the undetermined pixel Pu is set as a pixel value of the input image I corresponding to the pixel position of the pixel Pd, which is the nearest foreground pixel retrieved as the shortest path.

At this time, the pixel selected as the shortest path set in the nearest foreground pixel map image N may not be a proper pixel. Hence, an average value obtained by applying a predetermined weight to a plurality of determined pixels at the boundary around the pixel selected as the shortest path may be determined as the pixel value of the undetermined pixel.

More specifically, referring to FIG. 17, for the undetermined pixel corresponding to the pixel Pu, an average value of the pixel Pd set as the shortest path and determined pixels SFP1 to SFP8 at the boundary and near the pixel Pd may be obtained and determined as the pixel value of the undetermined pixel Pu.

For the pixel near the pixel Pu, for example, see Jue Wang, M F Cohen, Optimized Color Sampling for Robust Matting, Computer Vision and Pattern Recognition, 2007.

With the above processing, since the undetermined pixel is replaced with the pixel of the foreground object image, the undetermined pixel which reaches the pixel of the foreground object image through the shortest path provided by the minimum integral value of the differential values, a natural color can be reproduced in the foreground object image. Accordingly, color blur of the background image at the foreground object image can be restricted in the region near the boundary between the foreground object image and the background image can be restricted.

Figure 16:
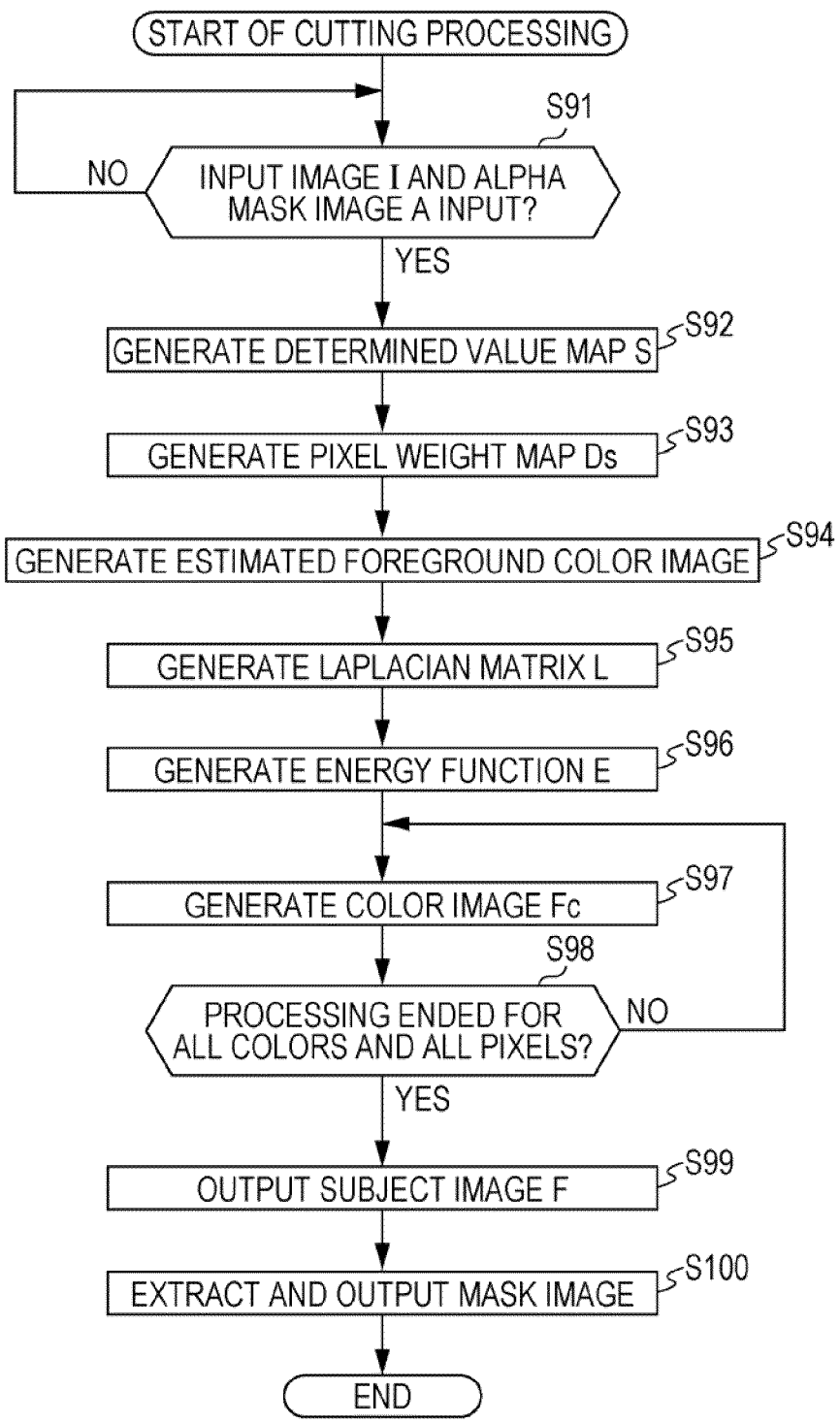
FIG. 16 is a flowchart explaining cutting processing.

Here, the description returns to the flowchart in FIG. 16.

In step S95, the Laplacian matrix generator 86 generates a Laplacian matrix L from the alpha mask image A, and supplies the Laplacian matrix L to the energy function generator 87. Specifically, the Laplacian matrix generator 86 generates a Laplacian matrix of a square matrix with a total number of pixels (number of nodes)×a total number of pixels, for a graph structure indicative of the relationship among pixels, in the form of a square matrix with the equivalent numbers of rows and columns. To be more specific, the Laplacian matrix generator 86 generates a Laplacian matrix L in which a diagonal component in each row is a total sum of components other than the diagonal component in the same row and the sign is reversed. That is, when components are added together in each row, the sum becomes 0.

Figure 18:
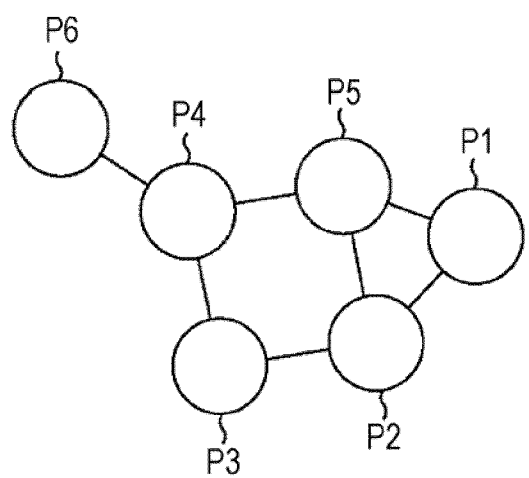
FIG. 18 is an illustration explaining the cutting processing.

For example, pixels P1 to P6 are connected as shown in FIG. 18, and pixels connected by a line segment in the drawing are adjacent to each other. When the relationship shown in FIG. 18 is established, the Laplacian matrix generator 86 generates a Laplacian matrix L as represented by Expression (6) as follows:

$$L = \begin{pmatrix} 2 & -1 & 0 & 0 & -1 & 0 \\ -1 & 3 & -1 & 0 & -1 & 0 \\ 0 & -1 & 2 & -1 & 0 & 0 \\ 0 & 0 & -1 & 3 & -1 & -1 \\ -1 & -1 & 0 & -1 & 3 & 0 \\ 0 & 0 & 0 & -1 & 0 & 1 \end{pmatrix}. \qquad (6)$$

Specifically, referring to FIG. 18, the pixels P2 and P5 are connected to the pixel P1. Hence, the Laplacian matrix generator 86 sets "−1" for the second and fifth columns corresponding to the pixels P2 and P5, and sets "2" (=|−1|×2) for the first column in the first row as shown in the Laplacian matrix L in Expression (6).

Similarly, referring to FIG. 18, the pixels P1, P3, and P5 are connected to the pixel P2. Hence, the Laplacian matrix generator 86 sets "−1" for the first, third, and fifth columns corresponding to the pixels P1, P3, and P5, and sets "3" (=|−1|×3) for the second column in the second row as shown in the Laplacian matrix L in Expression (6).

Further similarly, referring to FIG. 18, the pixels P2 and P4 are connected to the pixel P3. Hence, the Laplacian matrix generator 86 sets "−1" for the second and fourth columns corresponding to the pixels P2 and P4, and sets "2" (=|−1|×2) for the third column in the third row as shown in the Laplacian matrix L in Expression (6).

Further similarly, referring to FIG. 18, the pixels P3, P5, and P6 are connected to the pixel P4. Hence, the Laplacian matrix generator 86 sets "−1" for the third, fourth, and sixth columns corresponding to the pixels P3, P5, and P6 and sets "3" (=|−1|×3) for the fourth column in the fourth row as shown in the Laplacian matrix L in Expression (6).

Further similarly, referring to FIG. 18, the pixels P1, P2, and P4 are connected to the pixel P5. Hence, the Laplacian matrix generator 86 sets "−1" for the first, second, and fourth columns corresponding to the pixels P1, P2, and P4 and sets "3" (=|−1|×3) for the fifth column in the fifth row as shown in the Laplacian matrix L in Expression (6).

Further similarly, referring to FIG. 18, only the pixel P4 is connected to the pixel P6. Hence, the Laplacian matrix generator 86 sets "−1" for the fourth column corresponding to the pixel P4, and sets "1" (=|−1|×1) for the fourth column in the sixth row as shown in the Laplacian matrix L in Expression (6).

In step S96, the energy function generator 87 generates an energy function E by using the foreground color image F shown in Expression (7) as a parameter, based on the pixel weight map image Ds, the Laplacian matrix L, and the estimated foreground color image F^, and supplies the generated energy function E to the foreground color image generator 88. Expression (7) is as follows:

$$x = \arg\min(x^T L x + \lambda (x - F^\wedge)^T D s (x - F^\wedge)) \qquad (7),$$

where, arg min(Q) is a mathematical symbol that is a function for determining a value of a parameter x so that a value of a function Q becomes minimum; and x is vectors for pixels in a color image Fc that forms the foreground color image F to be generated. Owing to this, Expression (7) provides a combination of vectors x resulting in the minimum energy function E. Also, $x^T$ and $(x-F\hat{})^T$ represent transposition of the vectors x and $(x-F\hat{})$, L is a Laplacian matrix, $\lambda$ is a coefficient of a positive value, and Ds is a pixel weight map image.

In Expression (7), "$x^T L x$" is a smoothing term, and "$\lambda (x-F\hat{})^T Ds(x-F\hat{})$" is a data term.

The smoothing term is a term that operates to determine the vector x such that values of adjacent pixels are smoothly arranged (or identical). Also, the data term is a term that operates to cause the vector x to become close to the estimated foreground color image $F\hat{}$ such that the vector x and the estimated foreground color image $F\hat{}$ become 0.

The smoothing term and the data term mutually have the relationship of trade off. If one of the values is controlled to be 0 (minimum) in preference to the other value, the other value becomes larger. Therefore, Expression (7) is calculated such that both values are balanced and the sum becomes minimum. In the actual calculation, the foreground color image generator 88 performs calculation with Expression (7) by conjugate gradient method or LU decomposition and minimizes the sum.

The coefficient $\lambda$ adjusts a relative intensity of the data term with respect to the smoothing term. The pixel weight map image Ds sets a relative priority of each row of the data term, i.e., sets the degree of influence to a pixel value of a pixel that forms the foreground object image. In particular, if a term of 1.0 is present in the pixel weight map image Ds, a force of constraint becomes large by the coefficient $\lambda$, and as $\lambda$ becomes small, the force of constraint becomes small. If the force of constraint becomes 0 due to the pixel weight map image Ds or the coefficient $\lambda$, the importance of the data term becomes zero, and the energy function E is determined only by the smoothing term. The pixel weight map image Ds is a positive value and typically in a range from 0.0 to 1.0; however, it is not limited thereto.

The smoothing term and the data term employ quadrics (a vector x is multiplied two times) to obtain a mathematically minimum solution. For example, if a differential expression is used as shown in Expression (8), a minimum value can be obtained as follows:

$$(L+\lambda Ds)x=\lambda F\hat{} \quad (8).$$

In step S97, the foreground color image generator 88 arithmetically operates Expression (8), to solve the vector x and obtain a color image Fc included in the foreground color image F.

In step S98, the foreground color image generator 88 judges whether or not color images Fc for all colors of red, green, and blue (RGB) are obtained. If the processing for all colors is not ended, the processing returns to step S97, and executes the processing for an unprocessed color. That is, the processing of steps S97 and S98 is repeated until the color images Fc for all colors are obtained.

In step S98, if it is judged that the color images Fc are obtained for all colors and the processing is ended, in step S99, the foreground color image generator 88 forms a foreground color image F by using the color images Fc for all colors, and outputs the foreground color image F as the foreground object image F that is set based on the alpha mask image A in the input image I. At this time, the foreground color image generator 88 outputs the foreground object image F also to the mask image generator 89.

In step S100, the mask image generator 89 sets a region of the input image I corresponding to the foreground object image F, as a mask region, and generates and outputs a mask image B.

With this processing, the vector x defined by the pixel value of each color of the foreground color image is obtained such that the energy function E becomes minimum, the foreground color image F is obtained from the color image Fc of each color defined by the vector x, and the foreground color image F is formed as the foreground object image F. As the result, color blur of the background image at the foreground object image can be restricted in the region near the boundary between the foreground object image and the background image.

Mask Image Recovery Processing

Figure 19:
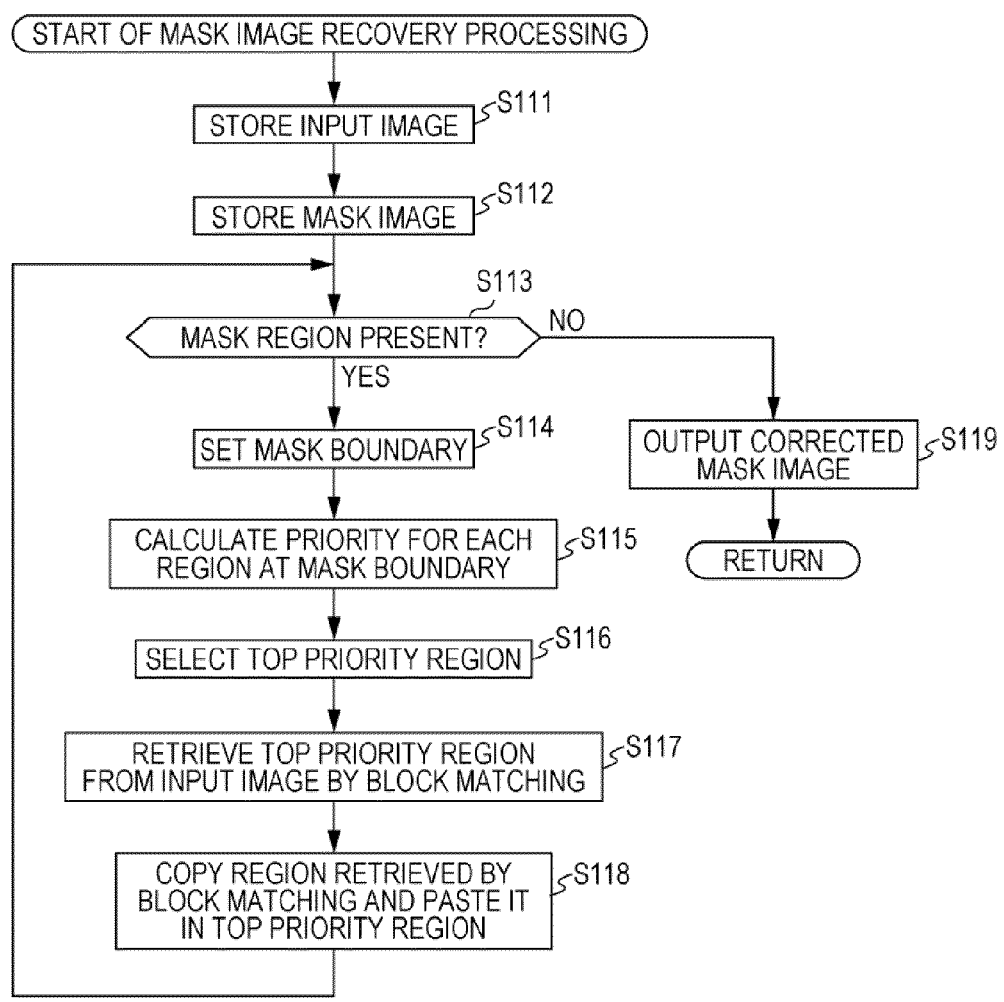
FIG. 19 is a flowchart explaining mask image recovery processing.

Next, mask image recovery processing will be described with reference to a flowchart in FIG. 19.

In step S111, the input image storage unit 101 stores an input image.

In step S112, the mask image acquiring unit 109 acquires a mask image supplied from the subject cutting unit 25, and stores the mask image in the mask image storage unit 110.

In step S113, the recovery unit 107 reads the mask image stored in the mask image storage unit 110, and judges whether a mask region is present in the mask image or not. In step S113, for example, if it is judged that the mask region is present in the mask image, the processing goes to step S114.

In step S114, the mask boundary setting unit 102 sets a range that serves as a boundary with respect to the mask region in the input image from information of the mask image, and stores information of the boundary with respect to the mask region in the set input image, in the mask boundary information storage unit 103.

In step S115, the region priority calculator 104 divides the range set as the boundary with respect to the mask region into a plurality of predetermined regions, calculates priorities of the respective predetermined regions, and supplies information of the priorities of the respective predetermined regions to the top priority region selector 105. More specifically, the region priority calculator 104 calculates a priority such that a region with a largest number of edges has a high priority. The method for obtaining the priority is not limited thereto, and may be other method as long as a priority can be set. For the other method, see A. Criminisi, P. Perez, K. Toyama, Object Removal by Exemplar-Based Inpainting, CVPR 2003.

In step S116, the top priority region selector 105 selects a predetermined region with a maximum value of the priority (a top priority) supplied from the region priority calculator 104, and supplies information of an image of the selected predetermined region to the block matching processor 106.

In step S117, the block matching processor 106 cyclically retrieves a region the most similar to a pixel value (a luminance value) of the predetermined region with the top priority at the boundary region with respect to the mask region, in the input image by block matching processing.

In step S118, the block matching processor 106 copies information of the predetermined region that is adjacent to the retrieved region the most similar to the pixel value (the luminance value) of the predetermined region and that corresponds to the position of the mask region to which the predetermined region with the top priority is adjacent, and supplies the copied information to the recovery unit 107. The recovery unit 107 reads the mask image stored in the mask image storage unit 110. Then, the recovery unit 107 pastes an image of the supplied copied predetermined region in the region adjacent to the region the most similar to the luminance value of the retrieved predetermined region, at the position of the mask region to which the predetermined region with the top priority is adjacent, thereby recovering the mask region of the mask image. Further, the recovery unit 107 updates the information of the recovered mask region and stores the mask image in the mask image storage unit 110. The processing returns to step S113. Then, in step S113, the processing from step S113 to step S118 is repeated until it is judged that the mask region is not present.

That is, the priority is calculated as a higher value as the predetermined region has a higher frequency of repetition in the boundary region with respect to the mask region in the input image. Hence, if a similar predetermined region is present in the other region of the input image, a region adjacent thereto may likely include information of the background image which should be present in the region that becomes the mask image. Therefore, a predetermined region the most similar to the predetermined region with the top priority is retrieved, an adjacent region adjacent to the retrieved predetermined region is pasted on the mask image to recover the mask image, and the similar processing is repeated until the mask image is no longer present. That is, the priority becomes high at a position at which a failure is noticeable.

In step S113, if it is judged that the mask region is not present, i.e., if it is judged that the mask region is completely recovered and the background image is generated, the processing goes to step S119.

In step S119, the recovery unit 107 recognizes that the mask region of the mask image is recovered and the background image is generated for the background image output unit 108. The recovery unit 107 stores the mask image stored in the mask image storage unit 110, into the background image storage unit 27, as the background image.

With the above processing, for example, in the case shown in FIG. 2, since the background region of a single color is present as seen in the boundary region with respect to the subject region in the image P3, an image of a single color is repetitively retrieved as a predetermined region with a high priority. Hence, for example, as shown in the image P5 in FIG. 2, the mask region where the subject was present is naturally recovered as an image of a background color, or a peripheral image. As the result, the image cut as the subject cut image can be provided with a natural background when the cut image is arranged at any position on the image.

Image Composition Processing

Figure 20:
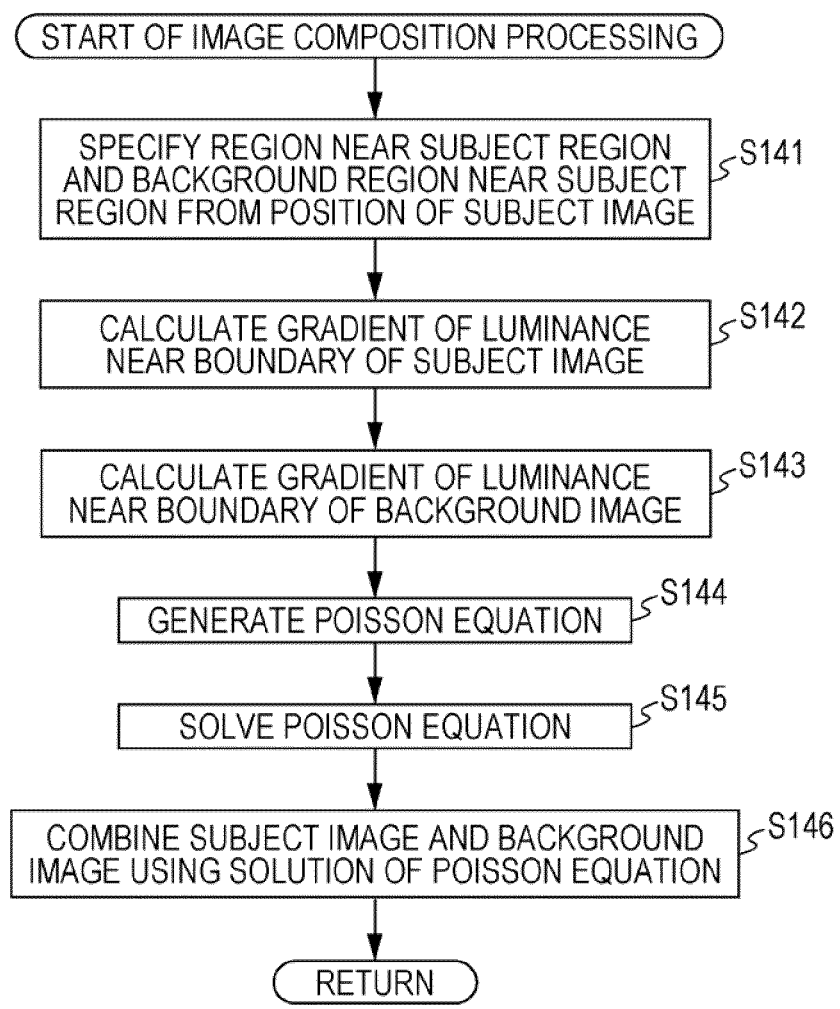
FIG. 20 is a flowchart explaining image composition processing.

Next, image composition processing will be described with reference to a flowchart in FIG. 20.

In step S141, the subject image gradient calculator 121 and the background image gradient calculator 122 respectively specify a region of a subject region cut image and a region of a background image, based on an instruction content supplied from the instruction unit 33 in accordance with an operation content of the operation unit 34.

In step S142, the subject image gradient calculator 121 reads the subject cut image stored in the subject cut image storage unit 29, obtains a gradient of pixel values or luminance values in the subject image from a distribution of the pixel values or luminance values, and supplies the obtained gradient to the Poisson equation generator 123.

In step S143, the background image gradient calculator 122 reads the background image stored in the background image storage unit 27, obtains a gradient of pixel values or luminance values in the background image from a distribution of the pixel values or luminance values, and supplies the obtained gradient to the Poisson equation generator 123.

To be more specific, the subject image gradient calculator 121 and the background image gradient calculator 122 calculate gradients by using differences between a target pixel that is a pixel of a processing target and four pixels adjacent thereto.

In step S144, the Poisson equation generator 123 generates a Poisson equation by using the operation result of the gradient of the subject cut image and the operation result of the gradient of the background image, and supplies the generated Poisson equation to the Poisson equation operator 124.

In step S145, the Poisson equation operator 124 solves the Poisson equation supplied from the Poisson equation generator 123 through an arithmetical operation, obtains a distribution near the boundary that is generated as the result of the composition of the subject cut image and the background image, and supplies the operation result to the composition processor 125.

To be more specific, if a pixel value f that satisfies Expression (9) given below is obtained, the subject cut image and the background image can be combined. Expression (9) is as follows:

$$\min_f \int\int_\Omega |\nabla f|^2 \text{ with } f|_{\partial\Omega} = f^*|_{\partial\Omega}, \tag{9}$$

where, f is a pixel value of the subject cut image, f* is a pixel value of the background image to be combined, $\Omega$ is a region to be combined, and $\partial\Omega$ is a boundary of a composite region.

Based on Expression (9), the Poisson equation generator 123 obtains Expression (10). The Poisson equation operator 124 solves Expression (10) to obtain a distribution near the boundary. Expression (10) is as follows:

$$\Delta f = \text{divv over } \Omega, \text{ with } f|_{\partial\Omega} = f^*|_{\partial\Omega}, \tag{10}$$

For the detail of the solution with the Poisson equation, for example, see Patrick Perez, Michel Gangnet, Andrew Blake, Poisson Image Editing, SIGGRAPH 2003.

In step S146, the composition processor 125 generates a composite image of the subject cut image and the background image from the operation result of the Poisson equation operator 124, and supplies the composite image to the display processor 31 to display the composite image on the display 32.

That is, the image composition unit 28 combines the subject cut image and the background image by so-called Poisson image composition processing. Accordingly, the composition can be made with a natural color distribution at the boundary between the subject cut image and the background image.

With this processing, with the embodiment of the present invention, even when a subject is freely moved in an image, a mask region that is generated when the subject is cut can be recovered. Editing such as freely moving the subject cut image in the image can be performed. Further, at this time, the subject cut image and the background image can be combined with natural color arrangement by Poisson image composition. Image editing without unnatural feeling can be performed.

Second Embodiment

Another Configuration Example of Subject Region Detector

In the above description, when the subject is detected, the subject map is generated by extracting the luminance information, color information, edge information, subject information, and motion information, and the subject region is specified from the information of the subject map. However, other configuration may be employed as long as the subject can be detected. That is, for example, a configuration that detects a subject by using Fourier function transform (FFT) may be employed. This is a method that determines a region without a component smoothened in a frequency region, as a target region. For the detail, see Xiaodi Hou, Liqing Zhang, Saliency Detection: A Spectral Residual Approach, CVPR 2007.

FIG. 21 is another configuration example of the subject region detector 21.

The subject region detector 21 in FIG. 21 is a configuration example that detects a subject by using FFT, and includes an FFT operator 141, a log operator 142, a smoothing operator 143, a difference operator 144, an inverse Fourier function transform (IFFT) operator 145, and an angular component extractor 146.

The FFT operator 141 performs FFT conversion processing for an input image, and outputs the operation result to the log operator 142. At this time, the angular component extractor 146 extracts an angular component in information output at the FFT conversion processing by the FFT operator 141, and supplies the angular component to the IFFT operator 145.

The log operator 142 performs logarithmic operation for the operation result of the FFT operator 141, and supplies the operation result to the smoothing operator 143 and the difference operator 144. The smoothing operator 143 smoothens the logarithmic operation result for the operation result by the FFT operator 141, and supplies the smoothened result to the difference operator 144. The difference operator 144 obtains a difference between a smoothened value and an not smoothened value from the operation result by the log operator 142, and supplies the difference to the IFFT operator 145. The IFFT operator 145 recognizes the difference operation result supplied from the difference operator 144 as a real part based on the angular component extracted by the angular component extractor 146 from the operation result by the FFT operator 141, and the angular component extracted by the angular component extractor 146 from the operation result by the FFT operator 141 as an imaginary part, applies an exponential function, then performs inverse FFT operation, and outputs the operation result as a subject region detection image.

Subject Region Detection Processing

Next, subject region detection processing by the subject region detector in FIG. 21 will be described with reference to a flowchart in FIG. 22.

In step S161, the FFT operator 141 performs the FFT conversion processing for the luminance of each pixel of the input image, and outputs the luminance to the log operator 142.

In step S162, the angular component extractor 146 extracts an angular component of information output at the FFT conversion processing by the FFT operator 141, and supplies the angular component to the IFFT operator 145.

In step S163, the log operator 142 performs a logarithmic operation for the absolute value of the operation result of the FFT operator 141, and supplies the operation result to the smoothing operator 143 and the difference operator 144.

In step S164, the smoothing operator 143 smoothens the logarithmic operation result for the operation result by the FFT operator 141, and supplies the smoothened result to the difference operator 144.

In step S165, the difference operator 144 obtains a difference between a smoothened value and an not smoothened value from the operation result by the log operator 142, and supplies the difference to the IFFT operator 145.

In step S166, the IFFT operator 145 recognizes the difference operation result supplied from the difference operator 144 as a real part and the angular component extracted by the angular component extractor 146 from the operation result by the FFT operator 141 as an imaginary part, applies an exponential function, and then the inverse FFT operation processing is performed.

In step S167, the IFFT operator 145 outputs the operation result of the inverse FFT operation processing as a subject region detection image.

With the above processing, even with the FFT operation, the subject region can be detected.

The aforementioned series of image processing may be executed by hardware or software. If the series of processing is executed by software, a program that forms the software may be installed in dedicated hardware of a computer, or a program that forms the software may be installed from a storage medium into a computer, for example, a general-purpose personal computer that can execute various functions by installing various programs.

FIG. 23 illustrates a configuration example of a general-purpose personal computer. The personal computer includes a central processing unit (CPU) 1001. The CPU 1001 is connected to an input/output interface 1005 through a bus 1004. The bus 1004 is connected to a read only memory (ROM) 1002 and a random access memory (RAM) 1003.

The input/output interface 1005 is connected to an input unit 1006 including an input device, such as a keyboard and/or a mouse, to which a user inputs an operation command; an output unit 1007 that outputs a processing operation screen or an image of a processing result on a display device; a storage unit 1008 including a hard disk drive or the like that stores a program and various data; and a communication unit 1009 that includes a local area network (LAN) adopter and executes communication processing through a network, such as the Internet. Also, the input/output interface 1005 is connected to a drive 1010 that reads and writes data from and on a removable medium 1011, such as a magnetic disk (including a flexible disk), an optical disc (including a compact disc-read only memory (CD-ROM) and a digital versatile disc (DVD), a magneto-optical disk (including mini disc (MD)), or a semiconductor memory.

The CPU 1001 executes various processing in accordance with a program stored in the ROM 1002, or a program that is read from the removable medium 1011, such as the magnetic disk, optical disc, magneto-optical disk, or semiconductor memory, that is installed in the storage unit 1008, and that is loaded from the storage unit 1008 into the RAM 1003. The RAM 1003 also appropriately stores data necessary for executing the various processing by the CPU 1001.

In this specification, in a step for writing a program that is stored in the storage medium, processing that is sequentially performed in the written order does not have to be sequentially performed, and the processing may include processing executed in parallel or processing individually executed.

In the specification, a system represents a entire apparatus including a plurality of devices.

The present application contains subject matter related to that disclosed in Japanese Priority Patent Application JP 2010-040698 filed in the Japan Patent Office on Feb. 25, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
   subject region detection means for detecting a region, where a subject is present, as a subject region from an input image;
   cutting means for cutting an image of the subject region from the input image;
   priority calculation means for calculating a priority of each of predetermined regions on a boundary with respect to the subject region, for the input image;
   retrieval means for retrieving a region similar to an image of a predetermined region with a top priority from among the priorities of the predetermined regions on the boundary with respect to the subject region, from the input image after the image of the subject region is cut;
   recovery means for recovering the subject region by copying an image of an adjacent region that is adjacent to the region similar to the predetermined region retrieved by the retrieval means and includes a region corresponding to a region cut as the subject region, and by pasting the image obtained by copying the adjacent region onto the region that is adjacent to the predetermined region with the top priority and cut as the subject region; and
   composition means for combining the image of the subject region cut by the cutting means with the image with the subject region recovered by the recovery means.

2. The image processing device according to claim 1, further comprising:
   additional region input means for inputting an additional region corresponding to the subject region; and
   subject region adding means for adding, as the subject region, the region with the additional region added to the subject region.

3. The image processing device according to claim 1,
   wherein the priority calculation means re-calculates a priority of each of the predetermined regions on the boundary with respect to the subject region recovered by the recovery means,
   wherein the retrieval means retrieves a region similar to an image of a predetermined region with a top priority from among the re-calculated priorities of the predetermined regions on the boundary with respect to the subject region, from the input image after the image of the subject region is cut, and
   wherein the recovery means recovers the subject region by copying an image of an adjacent region that is adjacent to the region similar to the predetermined region retrieved by the retrieval means and includes a region corresponding to a region cut as the subject region, and by pasting the image obtained by copying the adjacent region onto the region that is adjacent to the predetermined region with the top priority and cut as the subject region.

4. The image processing device according to claim 3, wherein the priority calculation means, the retrieval means, and the recovery means repeat their processing until an entire region of the subject region is recovered.

5. An image processing method of an image processing device, the device including
   subject region detection means for detecting a region, where a subject is present, as a subject region from an input image,
   cutting means for cutting an image of the subject region from the input image,
   priority calculation means for calculating a priority of each of predetermined regions on a boundary with respect to the subject region, for the input image,
   retrieval means for retrieving a region similar to an image of a predetermined region with a top priority from among the priorities of the predetermined regions on the boundary with respect to the subject region, from the input image after the image of the subject region is cut,
   recovery means for recovering the subject region by copying an image of an adjacent region that is adjacent to the region similar to the predetermined region retrieved by the retrieval means and includes a region corresponding to a region cut as the subject region, and by pasting the image obtained by copying the adjacent region onto the region that is adjacent to the predetermined region with the top priority and cut as the subject region, and
   composition means for combining the image of the subject region cut by the cutting means with the image with the subject region recovered by the recovery means,
   the method comprising the steps of:
   detecting the region, where the subject is present, as the subject region from the input image, by the subject region detection means;
   cutting the image of the subject region from the input image, by the cutting means;
   calculating the priority of each of the predetermined regions on the boundary with respect to the subject region, for the input image, by the priority calculation means;
   retrieving the region similar to the image of the predetermined region with the top priority from among the priorities of the predetermined regions on the boundary with respect to the subject region, from the input image after the image of the subject region is cut, by the retrieval means;
   recovering the subject region by copying the image of the adjacent region that is adjacent to the region similar to the predetermined region retrieved by the retrieving and includes the region corresponding to the region cut as the subject region, and by pasting the image obtained by copying the adjacent region onto the region that is adjacent to the predetermined region with the top priority and cut as the subject region, by the recovery means; and
   combining the image of the subject region cut by the cutting with the image with the subject region recovered by the recovering, by the composition means.

6. A non-transitory computer-readable medium storing a program executable by a computer that controls an image processing device, the device including
   subject region detection means for detecting a region, where a subject is present, as a subject region from an input image,
   cutting means for cutting an image of the subject region from the input image,
   priority calculation means for calculating a priority of each of predetermined regions on a boundary with respect to the subject region, for the input image,
   retrieval means for retrieving a region similar to an image of a predetermined region with a top priority from among the priorities of the predetermined regions on the boundary with respect to the subject region, from the input image after the image of the subject region is cut,
   recovery means for recovering the subject region by copying an image of an adjacent region that is adjacent to the region similar to the predetermined region retrieved by the retrieval means and includes a region corresponding to a region cut as the subject region, and by pasting the image obtained by copying the adjacent region onto the region that is adjacent to the predetermined region with the top priority and cut as the subject region, and composition means for combining the image of the subject region cut by the cutting means with the image with the subject region recovered by the recovery means, the program causing the computer to execute processing comprising the steps of:

detecting the region, where the subject is present, as the subject region from the input image, by the subject region detection means;

cutting the image of the subject region from the input image, by the cutting means;

calculating the priority of each of the predetermined regions on the boundary with respect to the subject region, for the input image, by the priority calculation means;

retrieving the region similar to the image of the predetermined region with the top priority from among the priorities of the predetermined regions on the boundary with respect to the subject region, from the input image after the image of the subject region is cut, by the retrieval means;

recovering the subject region by copying the image of the adjacent region that is adjacent to the region similar to the predetermined region retrieved by the retrieving and includes the region corresponding to the region cut as the subject region, and by pasting the image obtained by copying the adjacent region onto the region that is adjacent to the predetermined region with the top priority and cut as the subject region, by the recovering; and combining the image of the subject region cut by the cutting with the image with the subject region recovered by the recovering, by the composition means.

7. An image processing device comprising:

a subject region detector configured to detect a region, where a subject is present, as a subject region from an input image;

a cutting unit configured to cut an image of the subject region from the input image;

a priority calculator configured to calculate a priority of each of predetermined regions on a boundary with respect to the subject region, for the input image;

a retrieval unit configured to retrieve a region similar to an image of a predetermined region with a top priority from among the priorities of the predetermined regions on the boundary with respect to the subject region, from the input image after the image of the subject region is cut;

a recovery unit configured to recover the subject region by copying an image of an adjacent region that is adjacent to the region similar to the predetermined region retrieved by the retrieval unit and includes a region corresponding to a region cut as the subject region, and by pasting the image obtained by copying the adjacent region onto the region that is adjacent to the predetermined region with the top priority and cut as the subject region; and a composition unit configured to combine the image of the subject region cut by the cutting unit with the image with the subject region recovered by the recovery unit.

* * * * *